US012801469B2

(12) United States Patent
Lee et al.

(10) Patent No.: US 12,801,469 B2
(45) Date of Patent: Nov. 17, 2026

(54) MODELING METHOD FOR ESTIMATING USED LIFETIME OF MEMORY DEVICE, METHOD OF CALCULATING REMAINING USEFUL LIFETIME OF MEMORY DEVICE USING THE SAME, AND SYSTEM PERFORMING THE SAME

(71) Applicant: Samsung Electronics Co., Ltd., Suwon-si (KR)

(72) Inventors: Jiho Lee, Suwon-si (KR); Seyoung Kim, Suwon-si (KR); Jongkyun Kim, Suwon-si (KR); Jiwon Kim, Suwon-si (KR); Jieun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 19/017,135

(22) Filed: Jan. 10, 2025

(65) Prior Publication Data

US 2025/0258730 A1 Aug. 14, 2025

(30) Foreign Application Priority Data

Feb. 8, 2024 (KR) ........................ 10-2024-0019315

(51) Int. Cl.
*G06F 11/00* (2006.01)

(52) U.S. Cl.
CPC ........ *G06F 11/004* (2013.01); *G06F 2201/81* (2013.01)

(58) Field of Classification Search
CPC ....... G06F 11/004; G06F 11/008; G06N 3/08; G06N 7/01; G06N 20/00; G06N 20/10; G06N 20/20

(Continued)

(56) References Cited

U.S. PATENT DOCUMENTS 8,725,456 B1 * 5/2014 Saha .................. G05B 23/0283 702/182
9,672,310 B1 6/2017 Oliva et al.
(Continued)

FOREIGN PATENT DOCUMENTS

CN 112466387 3/2021
CN 114091281 2/2022
(Continued)

OTHER PUBLICATIONS

Huang et al., "Real-Time Prediction for IC Aging Based on Machine Learning, " IEEE Transactions on Instrumentation and Measurement, Dec. 2019, vol. 68, No. 12, 9 pages.

*Primary Examiner* — Chae M Ko
(74) *Attorney, Agent, or Firm* — Fish & Richardson P.C.

(57) ABSTRACT

In an example modeling method for estimating used lifetime of a memory device, a plurality of performance measurement data associated with a plurality of performances of a plurality of unused memory devices are obtained based on an accelerated aging test performing on the plurality of unused memory devices. A plurality of statistical data are calculated based on performing a statistical distribution approximation on the plurality of performance measurement data. A plurality of conditional probabilities are calculated based on a plurality of sample performance data associated with the plurality of performances and the plurality of statistical data. A lifetime calculation model is trained based on the plurality of conditional probabilities. The lifetime calculation model outputs estimated used lifetime data and uncertainty data. The estimated used lifetime data corresponds to the plurality of sample performance data. The uncertainty data represents uncertainty of the estimated used lifetime data.

20 Claims, 30 Drawing Sheets

(58) Field of Classification Search
USPC ......... 714/47.1, 47.3; 706/16, 17, 25, 48, 52
See application file for complete search history.

(56) References Cited

U.S. PATENT DOCUMENTS

| | | | | |
|---|---|---|---|---|
| 10,147,048 | B2 | 12/2018 | Chen et al. | |
| 10,303,541 | B2 | 5/2019 | Milor et al. | |
| 2012/0023042 | A1* | 1/2012 | Das | G06N 7/01 706/12 |
| 2015/0323611 | A1* | 11/2015 | Kise | G01R 31/367 702/63 |
| 2016/0232450 | A1* | 8/2016 | Chen | G06F 11/3058 |
| 2022/0100389 | A1* | 3/2022 | Lv | G06F 3/0614 |
| 2022/0137827 | A1* | 5/2022 | Schaefer | G06F 3/0655 711/154 |
| 2022/0187819 | A1* | 6/2022 | Shalaby | G06F 18/214 |
| 2022/0215956 | A1* | 7/2022 | Kong | G06T 7/11 |

FOREIGN PATENT DOCUMENTS

| | | | |
|---|---|---|---|
| CN | 114705973 | 7/2022 | |
| CN | 115308558 | 11/2022 | |
| CN | 115495909 | 12/2022 | |
| CN | 116635835 | 8/2023 | |
| WO | WO-2021040810 A1 * | 3/2021 | H04L 69/40 |

* cited by examiner

1000

100

| | PMDAT1 | PMDAT2 | ··· | PMDATK |
|---|---|---|---|---|
| PF1 | PMDAT1-1 | PMDAT2-1 | ··· | PMDATK-1 |
| ⋮ | ⋮ | ⋮ | ··· | ⋮ |
| PFL | PMDAT1-L | PMDAT2-L | ··· | PMDATK-L |

FIG. 16A

Given measurment values:

$$x_{N_{yr},k} = (t_{ck}, t_{dc}, t_{pd_r}, t_{pd_f}, duty)_k,$$

$$k = 1, \ldots, 60 \text{ (DUT ID )}$$

$$N_{yr} = 0, 2, 4, 8, 16, 20 \text{ (Equv Used Year)}$$

stat. fittings:

$$\hat{\mu}_{N_{yr}} = (1/N)(\sum_{k=1...N} x_{N_{yr},K}), N = 60$$

$$\hat{\Sigma}_{N_{yr}} = (1/N)(\sum_{k=1...N} (x_{N_{yr},k} - \hat{\mu}_{N_{yr}})^T (x_{N_{yr},k} - \hat{\mu}_{N_{yr}})), N = 60$$

$$P(x^*, N_{yr}) = (2\pi)^{-D/2}(det(\Sigma_{N_{yr}}))^{-1/2} exp((-1/2)(x^* - \hat{\mu}_{N_{yr}})(\hat{\Sigma}_{N_{yr}})^{-1}(x^* - \hat{\mu}_{N_{yr}})^T)), D = 5$$

measured for unknwon chip:

$$x^* = (t_{ck}, \ldots, duty)$$

conditional prob's & layers:

$$P(N_{yr}|x^*) = P(x^*, N_{yr})/(\Sigma_{N_{yr}=0,2,4,...}(P(x^*, N_{yr})))$$

$$sigmoid(x; \theta) = 1/(1 + exp(-\theta x))$$

Final est. year:

$$\hat{M}_{yr}(x^*) = \Sigma_{N_{yr}=0,2,4,...}(N_{yr} \times sigmoid(P(N_{yr}|x^*); \theta_{opt}))$$

MODELING METHOD FOR ESTIMATING USED LIFETIME OF MEMORY DEVICE, METHOD OF CALCULATING REMAINING USEFUL LIFETIME OF MEMORY DEVICE USING THE SAME, AND SYSTEM PERFORMING THE SAME

CROSS-REFERENCE TO RELATED APPLICATION

This application claims priority under 35 USC § 119 to Korean Patent Application No. 10-2024-0019315 filed on Feb. 8, 2024 in the Korean Intellectual Property Office (KIPO), the contents of which are herein incorporated by reference in their entirety.

BACKGROUND

Semiconductor memory devices may be divided into two categories depending upon whether or not they retain stored data when disconnected from a power supply. These categories include volatile memory devices, which lose stored data when disconnected from power, and nonvolatile memory devices, which retain stored data when disconnected from power. While volatile memory devices may perform read and write operations at a high speed, contents stored therein may be lost at power-off. Since nonvolatile memory devices retain contents stored therein even at power-off, they may be used to store data that needs to be retained.

As semiconductor memory devices operate, components such as transistors included in the semiconductor memory devices may wear out, and remaining useful lifetime of the semiconductor memory devices may be reduced. Recently, there have been high demands of recertification business to reuse semiconductor memory devices that are already used, and the remaining useful lifetime of the semiconductor memory devices that are already used should be identified for the recertification business. The remaining useful lifetime may depend on the usage history of the semiconductor memory devices, but it is difficult to accurately recognize the usage history.

SUMMARY

The present disclosure relates to a modeling method capable of generating an estimation model for efficiently estimating used lifetime of a memory device without a usage history of the memory device and without a dedicated integrated circuit (IC).

The present disclosure relates to a method of calculating remaining useful lifetime of a memory device using the estimation model generated by the modeling method.

The present disclosure relates to a system performing the modeling method and/or the method of calculating the remaining useful lifetime.

In some implementations, in a modeling method for estimating used lifetime of a memory device, the modeling method is performed by executing program code by at least one processor, and the program code is stored in a non-transitory computer readable medium. A plurality of performance measurement data associated with a plurality of performances of a plurality of unused memory devices are obtained while an accelerated aging test is performing on the plurality of unused memory devices. A plurality of statistical data are calculated by performing a statistical distribution approximation on the plurality of performance measurement data. A plurality of conditional probabilities are calculated based on a plurality of sample performance data associated with the plurality of performances and the plurality of statistical data. A lifetime calculation model is trained based on the plurality of conditional probabilities. The lifetime calculation model outputs estimated used lifetime data and uncertainty data. The estimated used lifetime data corresponds to the plurality of sample performance data. The uncertainty data represents uncertainty of the estimated used lifetime data.

In some implementations, in a method of calculating remaining useful lifetime of a memory device, the method is performed by executing program code by at least one processor, and the program code is stored in a non-transitory computer readable medium. A lifetime calculation model is generated using a plurality of unused memory devices. A plurality of performance data associated with a plurality of performances of at least one target memory device that has already been used are measured. Remaining useful lifetime of the at least one target memory device is obtained based on the lifetime calculation model and the plurality of performance data associated with the plurality of performances. When generating the lifetime calculation model, a plurality of performance measurement data associated with the plurality of performances of the plurality of unused memory devices are obtained while an accelerated aging test is performing on the plurality of unused memory devices. A plurality of statistical data are calculated by performing a statistical distribution approximation on the plurality of performance measurement data. A plurality of first conditional probabilities are calculated based on a plurality of sample performance data associated with the plurality of performances and the plurality of statistical data. The lifetime calculation model is trained based on the plurality of first conditional probabilities. The lifetime calculation model outputs first estimated used lifetime data and first uncertainty data. The first estimated used lifetime data corresponds to the plurality of sample performance data. The first uncertainty data represents uncertainty of the first estimated used lifetime data.

In some implementations, a system includes a reliability testing equipment, a performance measuring equipment, at least one processor and a non-transitory computer readable medium. The reliability testing equipment performs an accelerated aging test on a memory device. The performance measuring equipment measures a plurality of performances of the memory device. The non-transitory computer readable medium stores program codes executed by the at least one processor to generate a lifetime calculation model for obtaining remaining useful lifetime of the memory device. The at least one processor obtains, using the reliability testing equipment and the performance measuring equipment, a plurality of performance measurement data associated with the plurality of performances of a plurality of unused memory devices while the accelerated aging test is performing on the plurality of unused memory devices, calculates a plurality of statistical data by performing a statistical distribution approximation on the plurality of performance measurement data, calculates a plurality of conditional probabilities based on a plurality of sample performance data associated with the plurality of performances and the plurality of statistical data, and trains the lifetime calculation model based on the plurality of conditional probabilities. The memory device and the plurality of unused memory devices are memory devices of a same type. The lifetime calculation model outputs estimated used lifetime data and uncertainty data. The estimated used lifetime data corresponds to the plurality of sample performance data. The uncertainty data represents uncertainty of the estimated used lifetime data.

In some implementations, in the modeling method for estimating the used lifetime of the memory device, the method of calculating the remaining useful lifetime of the memory device and the system, the used lifetime of the memory device may be estimated and/or the remaining useful lifetime of the memory device may be calculated, using actual performance parameters that are measured through actual operating paths within the memory device, without an additional on-chip IP or an additional dedicated IC that are located in the memory device. For example, the performance distribution may be modified to fit a statistical distribution, probability-based lifetime calculation may be performed based thereon. For example, the conservative lifetime calculation may be performed based on worst case conditions that are self-defined. For example, the accurate lifetime calculation may be performed based on various performance parameters. Accordingly, the operations of estimating the used lifetime of the memory device and/or calculating the remaining useful lifetime of the memory device may be efficiently performed, and the used lifetime and/or the remaining useful lifetime may be applied to the recertification business to reuse the memory devices that are already used.

BRIEF DESCRIPTION OF THE DRAWINGS

Illustrative, non-limiting example implementations will be more clearly understood from the following detailed description taken in conjunction with the accompanying drawings.

FIGS. 16A, 16B, and 16C are diagrams for describing an example of a modeling method for estimating used lifetime of a memory device.

DETAILED DESCRIPTION

Figure 1:
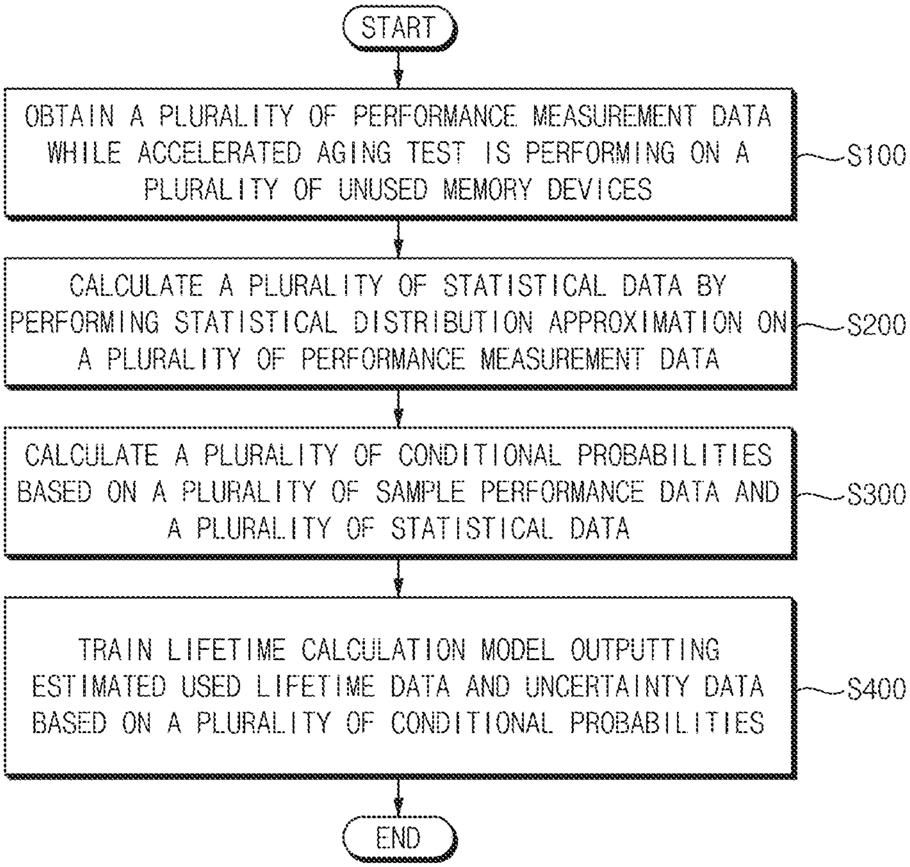
FIG. 1 is a flowchart illustrating an example of a modeling method for estimating used lifetime of a memory device.

Various example implementations will be described more fully with reference to the accompanying drawings, in which implementations are shown. The present disclosure may, however, be embodied in many different forms and should not be construed as limited to the implementations set forth herein. Like reference numerals refer to like elements throughout this application.

FIG. 1 is a flowchart illustrating an example of a modeling method for estimating used lifetime of a memory device.

Referring to FIG. 1, a modeling method may be performed to model or generate a lifetime calculation model, which is applied to estimate used lifetime (or used period) of a memory device and/or to calculate remaining useful lifetime (RUL) of a memory device. For example, the modeling method may be performed on a computer-based system and/or tool, at least part of which is implemented in hardware and/or software. For example, the system and/or tool may include a program (or program codes) that includes a plurality of instructions executed by at least one processor. The system and/or tool will be described with reference to FIGS. 2 and 3.

In the modeling method, a plurality of performance measurement data associated with a plurality of performances of a plurality of unused memory devices are obtained while an accelerated aging test is performing on the plurality of unused memory devices (operation S100). The plurality of unused memory devices may be the same products as the memory device (e.g., a target memory device) for which the used lifetime is to be estimated and/or the remaining useful lifetime is to be calculated. The plurality of unused memory devices may be new products that have not yet been used. For example, the plurality of unused memory devices and the target memory device may be memory devices of the same type that have the same structure and are manufactured by the same process. Operation S100 will be described with reference to FIGS. 6 and 10.

The accelerated aging test may be or may represent operations of measuring the change in performance over product operating time under accelerated conditions. For example, in the accelerated aging test, products may operate based on worst case scenarios that have been already known. For example, the worst case scenarios may be defined by a combination of specific conditions such as type of commands (e.g., such as idle/write/read operations), addresses, timings, etc. For example, the accelerated conditions may represent applying a higher voltage, temperature, etc., as compared to a voltage, temperature, etc. when the product is actually used (e.g., as compared to actual use conditions).

In some implementations, the memory device, e.g., each of the plurality of unused memory devices and the target memory device, may be a dynamic random access memory (DRAM) device. In some implementations, the memory device, e.g., each of the plurality ofunused memory devices and the target memory device, may be a flash memory device. However, example implementations are not limited thereto, and the memory device may be one of various volatile memory devices and/or one of various nonvolatile memory devices. A configuration of the memory device will be described with reference to FIGS. 17A, 17B, 18A, 18B and 18C.

A plurality of statistical data are calculated by performing a statistical distribution approximation on the plurality of performance measurement data (operation S200). For example, it may be assumed that the plurality of performance measurement data are formed according to a normal distribution, and various statistical values may be calculated based thereon. Operation S200 will be described with reference to FIG. 11.

A plurality of conditional probabilities are calculated based on a plurality of sample performance data associated with the plurality of performances and the plurality of statistical data (operation S300). For example, the plurality of sample performance data may have a configuration similar to that of the plurality of performance measurement data. For example, the plurality of conditional probabilities may represent probabilities under conditions in which the plurality of sample performance data are input. Operation S300 will be described with reference to FIG. 12.

The lifetime calculation model may be trained or learned based on the plurality of conditional probabilities (operation S400). The lifetime calculation model outputs estimated used lifetime data and uncertainty data, the estimated used lifetime data corresponds to the plurality of sample performance data, and the uncertainty data represents uncertainty of the estimated used lifetime data. For example, the lifetime calculation model may be implemented in the form of a machine learning model, a neural network model, an artificial intelligence (AI) model, etc. A configuration of the lifetime calculation model will be described with reference to FIGS. 5, 5A, 5B, 5C and 5D.

In some implementations, the lifetime calculation model may be implemented using Bayesian inference. However, example implementations are not limited thereto.

In the modeling method, the used lifetime of the memory device may be estimated and/or the remaining useful lifetime of the memory device may be calculated, using actual performance parameters that are measured through actual operating paths within the memory device, without an additional on-chip intellectual property (IP) or an additional dedicated integrated circuit (IC) that are located in the memory device. For example, the performance distribution may be modified to fit a statistical distribution, probability-based lifetime calculation may be performed based thereon. For example, the conservative lifetime calculation may be performed based on worst case conditions (e.g., operation sequences) that are self-defined. For example, the accurate lifetime calculation may be performed based on various performance parameters. Accordingly, the operations of estimating the used lifetime of the memory device and/or calculating the remaining useful lifetime of the memory device may be efficiently performed, and the used lifetime and/or the remaining useful lifetime may be applied to the recertification business to reuse the memory devices that are already used.

Figure 2:
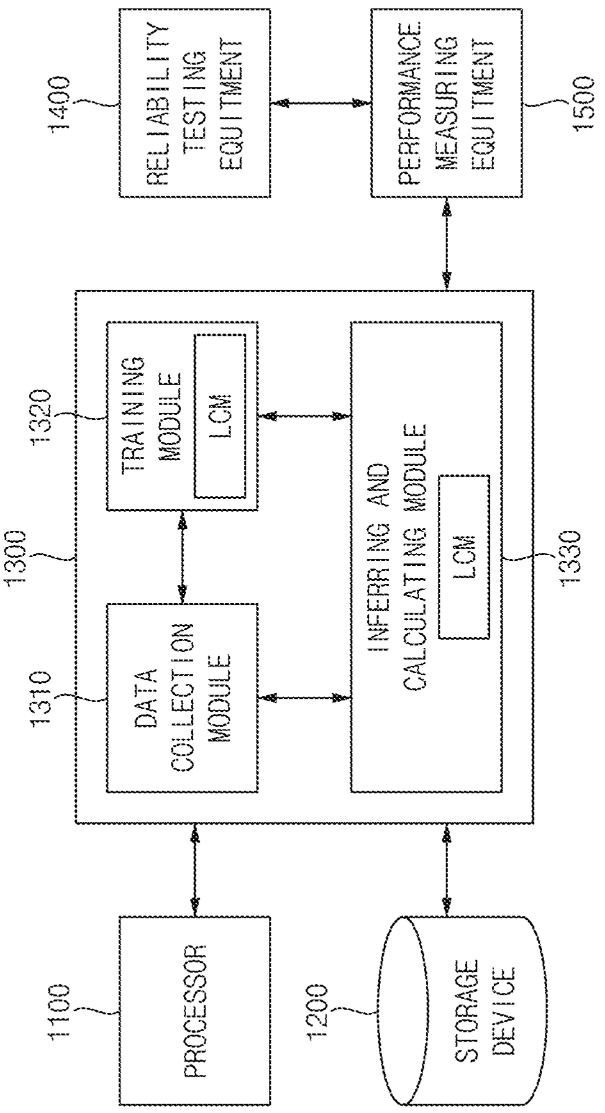
FIGS. 2 and 3 are block diagrams illustrating an example of a system.
Figure 3:
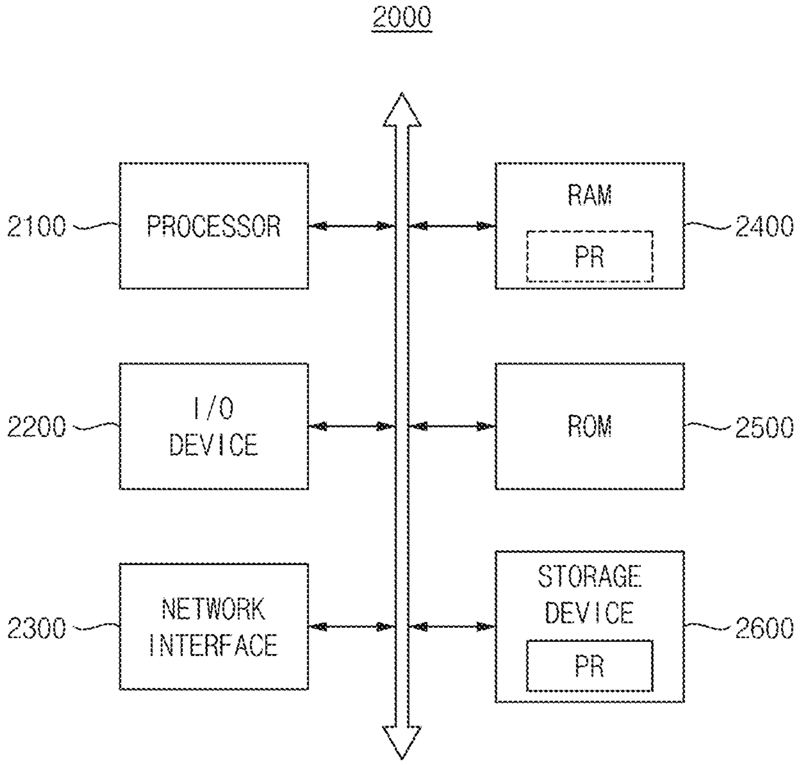

FIGS. 2 and 3 are block diagrams illustrating an example of a system.

Referring to FIG. 2, a system 1000 includes a processor 1100, a storage device 1200, a modeling and estimation module 1300, a reliability testing equipment 1400 and a performance measuring equipment 1500.

Herein, the term "module" may indicate, but is not limited to, a software and/or hardware component, such as a field programmable gate array (FPGA) or an application specific integrated circuit (ASIC), which performs certain tasks. A "module" may be configured to reside in a tangible addressable storage medium and be configured to execute on one or more processors. For example, a "module" may include components such as software components, object-oriented software components, class components and task components, and processes, functions, Routines, segments of program code, drivers, firmware, microcode, circuitry, data, databases, data structures, tables, arrays, and variables. A "module" may be divided into a plurality of "modules" that perform detailed functions.

The processor 1100 may be used when the modeling and estimation module 1300 performs computations or calculations. For example, the processor 1100 may include a microprocessor, an application processor (AP), a central processing unit (CPU), a digital signal processor (DSP), a graphic processing unit (GPU), a neural processing unit (NPU), or the like. Although FIG. 2 illustrates that the system 1000 includes one processor 1100, example implementations are not limited thereto. For example, the semiconductor design system 1000 may include a plurality of processors. In addition, the processor 1100 may include cache memories to increase computation capacity.

The storage device 1200 may store data used for operations of the processor 1100 and the modeling and estimation module 1300. In some implementations, the storage device (or storage medium) 1200 may include any non-transitory computer-readable storage medium used to provide commands and/or data to a computer. For example, the non-transitory computer-readable storage medium may include a volatile memory such as a static random access memory (SRAM), a dynamic random access memory (DRAM), or the like, and a nonvolatile memory such as a flash memory, a magnetic random access memory (MRAM), a phase-change random access memory (PRAM), a resistive random access memory (RRAM), a ferroelectric random access memory (FRAM), or the like. The non-transitory computer-readable storage medium may be inserted into the computer, may be integrated in the computer, or may be coupled to the computer through a communication medium such as a network and/or a wireless link.

The reliability testing equipment 1400 may perform accelerated aging tests (e.g., high temperature operating life (HTOL) tests) on memory devices. The performance measuring equipment 1500 may measure operational performance (e.g., various performance parameters associated with or related to input/output (I/O) timings) of memory devices.

The modeling and estimation module 1300 may perform the modeling method for estimating the used lifetime of the memory device described with reference to FIG. 1, and may perform a method of calculating remaining useful lifetime of a memory device, which will be described with reference to FIG. 19.

The modeling and estimation module 1300 may include a data collection module 1310, a training (or learning) module 1320, and an inferring and calculating module 1330.

The data collection module 1310 may perform a data collection operation for performing the modeling method for estimating the used lifetime of the memory device and/or the method of calculating the remaining useful lifetime of the memory device. For example, the data collection module 1310 may collect, via performance measuring equipment 1500, performance measurement data and performance data, may collect sample performance data, and may collect and/or generate various other data.

The training module 1320 may perform a training operation (or a re-training operation) for performing the modeling method for estimating the used lifetime of the memory device and/or the method of calculating the remaining useful lifetime of the memory device. For example, the training module 1320 may perform various operations, processing, data generating and storing, etc. for generating and training a lifetime calculation model LCM.

The inferring and calculating module 1330 may perform an inference operation and a calculation operation for performing the method of calculating the remaining useful lifetime of the memory device. For example, the inferring and calculating module 1330 may perform the remaining useful lifetime calculation operation for an already used memory device based on the lifetime calculation model LCM that has been trained and generated and using performance data that are obtained by the performance measuring equipment 1500 and a data collection module 1310, without an additional IP or IC.

The data collection module 1310 may perform operation S100 described with reference to FIG. 1, and may perform a part of operations S1100 and S1200 which will be described with reference to FIG. 19. The training module 1320 may perform operations S200, S300 and S400 described with reference to FIG. 1, and may perform another part of operation S1100 which will be described with reference to FIG. 19. The inferring and calculating module 1330 may perform operation S1300 which will be described with reference to FIG. 19.

In some implementations, the lifetime calculation model LCM, the data collection module 1310, the training module 1320, and the inferring and calculating module 1330 may be implemented as instructions or program codes that may be executed by the processor 1100. For example, the instructions or program codes of the lifetime calculation model LCM, the data collection module 1310, the training module 1320, and the inferring and calculating module 1330 may be stored in computer readable medium. For example, the processor 1100 may load the instructions or program codes to a working memory (e.g., a DRAM, etc.).

In other implementations, the processor 1100 may be manufactured to efficiently execute instructions or program codes included in the lifetime calculation model LCM, the data collection module 1310, the training module 1320, and the inferring and calculating module 1330. For example, the processor 1100 may efficiently execute the instructions or program codes from various AI modules and/or machine learning modules. For example, the processor 1100 may receive information corresponding to the lifetime calculation model LCM, the data collection module 1310, the training module 1320, and the inferring and calculating module 1330 to operate the lifetime calculation model LCM, the data collection module 1310, the training module 1320, and the inferring and calculating module 1330.

In some implementations, the data collection module 1310, the training module 1320, and the inferring and calculating module 1330 may be implemented as a single integrated module. In other implementations, the data collection module 1310, the training module 1320, and the inferring and calculating module 1330 may be implemented as separate and different modules.

Referring to FIG. 3, a system 2000 includes a processor 2100, an input/output (I/O) device 2200, a network interface 2300, a random access memory (RAM) 2400, a read only memory (ROM) 2500 and a storage device 2600. FIG. 3 illustrates an example where all of the data collection module 1310, the training module 1320, and the inferring and calculating module 1330 in FIG. 2 are implemented in software. For convenience of illustration, components corresponding to the reliability testing equipment 1400 and the performance measuring equipment 1500 in FIG. 2, which are implemented as separate equipments or facilities, are omitted.

The system 2000 may be a computing system. For example, the computing system may be a fixed computing system such as a desktop computer, a workstation or a server, or may be a portable computing system such as a laptop computer.

The processor 2100 may be substantially the same as the processor 1100 in FIG. 2. For example, the processor 2100 may include a core or a processor core for executing an arbitrary instruction set (for example, intel architecture-32 (IA-32), 64 bit extension IA-32, x86-64, PowerPC, Sparc, MIPS, ARM, IA-64, etc.). For example, the processor 2100 may access a memory (e.g., the RAM 2400 or the ROM 2500) through a bus, and may execute instructions stored in the RAM 2400 or the ROM 2500. As illustrated in FIG. 3, the RAM 2400 may store a program PR corresponding to the data collection module 1310, the training module 1320, and the inferring and calculating module 1330 in FIG. 2 or at least some elements of the program PR, and the program PR may allow the processor 2100 to perform operations for generating the lifetime calculation model LCM and/or calculating the remaining useful lifetime (e.g., operations S100, S200, S300, S400 and S500 in FIG. 1 and/or operations S1100, S1200 and S1300 in FIG. 19).

In other words, the program PR may include a plurality of instructions and/or procedures executable by the processor 2100, and the plurality of instructions and/or procedures included in the program PR may allow the processor 2100 to perform the operations for generating the lifetime calculation model LCM and/or calculating the remaining useful lifetime. Each of the procedures may denote a series of instructions for performing a certain task. A procedure may be referred to as a function, a routine, a subroutine, or a subprogram. Each of the procedures may process data provided from the outside and/or data generated by another procedure.

The storage device 2600 may be substantially the same as the storage device 1200 in FIG. 2. For example, the storage device 2600 may store the program PR. The program PR or at least some elements of the program PR may be loaded from the storage device 2600 to the RAM 2400 before being executed by the processor 2100. The storage device 2600 may store a file written in a program language, and the program PR generated by a compiler or the like or at least some elements of the program PR may be loaded to the RAM 2400.

The storage device 2600 may store data, which is to be processed by the processor 2100, or data obtained through processing by the processor 2100. The processor 2100 may process the data stored in the storage device 2600 to generate new data, based on the program PR and may store the generated data in the storage device 2600.

The I/O device 2200 may include an input device, such as a keyboard, a pointing device, or the like, and may include an output device such as a display device, a printer, or the like. For example, a user may trigger, through the I/O devices 2200, execution of the program PR by the processor 2100, and may provide or check various inputs, outputs and/or data, etc.

The network interface 2300 may provide access to a network outside the system 2000. For example, the network may include a plurality of computing systems and communication links, and the communication links may include wired links, optical links, wireless links, or arbitrary other type links. Various inputs may be provided to the system 2000 through the network interface 2300, and various outputs may be provided to another computing system through the network interface 2300.

In some implementations, the computer program codes, the lifetime calculation model LCM, the data collection module 1310, the training module 1320, and the inferring and calculating module 1330 may be stored in a transitory or non-transitory computer readable medium. In some implementations, values obtained from arithmetic processing performed by the processor may be stored in a transitory or non-transitory computer readable medium. In some implementations, intermediate values generated during the training operation may be stored in a transitory or non-transitory computer readable medium. In some implementations, various data such as performance measurement data (or performance data), statistical data, estimation data (or prediction data), and/or uncertainty data may be stored in a transitory or non-transitory computer readable medium. However, example implementations are not limited thereto.

FIGS. 4, 5A, 5B, 5C, and 5D are diagrams for describing an example of a lifetime calculation model.

Figure 4:
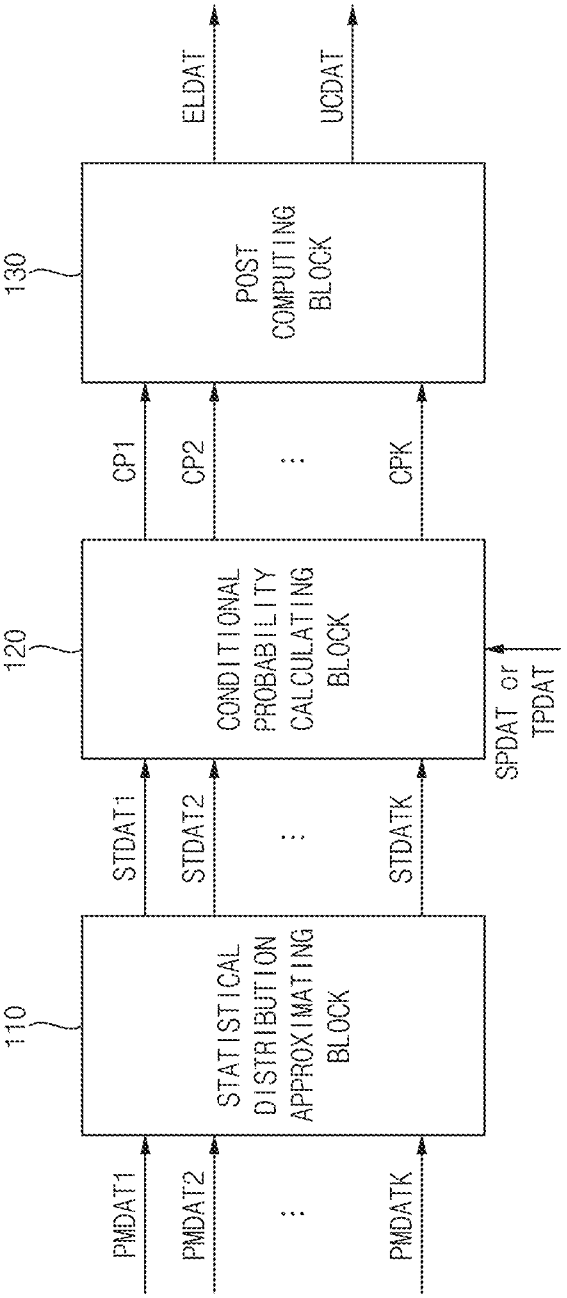
FIGS. 4, 5A, 5B, 5C, and 5D are diagrams for describing an example of a lifetime calculation model.

Referring to FIG. 4, a lifetime calculation model 100 may include a statistical distribution approximating block 110, a conditional probability calculating block 120 and a post computing block 130.

The statistical distribution approximating block 110 may calculate a plurality of statistical data STDAT1, STDAT2, . . . , STDATK by performing a statistical distribution approximation on a plurality of performance measurement data PMDAT1, PMDAT2, . . . , PMDATK.

For example, the statistical distribution approximating block 110 may calculate the first statistical data STDAT1 including various statistical values for the first performance measurement data PMDAT1, based on assuming that the first performance measurement data PMDAT1 obtained by the performance measuring equipment 1500 and the data collection module 1310 follow a normal distribution. Similarly, the statistical distribution approximating block 110 may calculate the second statistical data STDAT2 based on the second performance measurement data PMDAT2, and may calculate the Kth statistical data STDATK based on the Kth performance measurement data PMDATK, where K is a positive integer greater than or equal to three.

The conditional probability calculating block 120 may calculate a plurality of conditional probabilities CP1, CP2, . . . , CPK based on the plurality of statistical data STDAT1 to STDATK and one of a plurality of sample performance data SPDAT and a plurality of performance data TPDAT. For example, when the modeling method described with reference to FIG. 1 is performed, the plurality of sample performance data SPDAT may be provided as input. For example, when the method of calculating the remaining useful lifetime which will be described with reference to FIG. 19 is performed, the plurality of performance data TPDAT may be provided as input.

For example, the conditional probability calculating block 120 may calculate the first conditional probability CP1 in which first estimated usage time corresponding to the first performance measurement data PMDAT1 and the first statistical data STDAT1 therefor will be output when the plurality of sample performance data SPDAT or the plurality of performance data TPDAT are input. Similarly, the conditional probability calculating block 120 may calculate the second conditional probability CP2 based on the second statistical data STDAT2 and based on the plurality of sample performance data SPDAT or the plurality of performance data TPDAT, and may calculate the Kth conditional probability CPK based on the Kth statistical data STDATK and based on the plurality of sample performance data SPDAT or the plurality of performance data TPDAT.

The post computing block 130 may output estimated used lifetime data ELDAT and uncertainty data UCDAT based on the plurality of conditional probabilities CP1 to CPK. The estimated used lifetime data ELDAT may correspond to the plurality of sample performance data SPDAT or the plurality of performance data TPDAT. The uncertainty data UCDAT may represent uncertainty of the estimated used lifetime data ELDAT. In some implementations, only the configuration corresponding to the post computing block 130 may be referred to as the lifetime calculation model.

In some implementations, at least a part of the statistical distribution approximating block 110, the conditional probability calculating block 120 and the post computing block 130 may be implemented in software and/or hardware.

Referring to FIGS. 5A, 5B, 5C and 5D, examples of the post computing block 130 in FIG. 4 are illustrated.

Figure 5A:
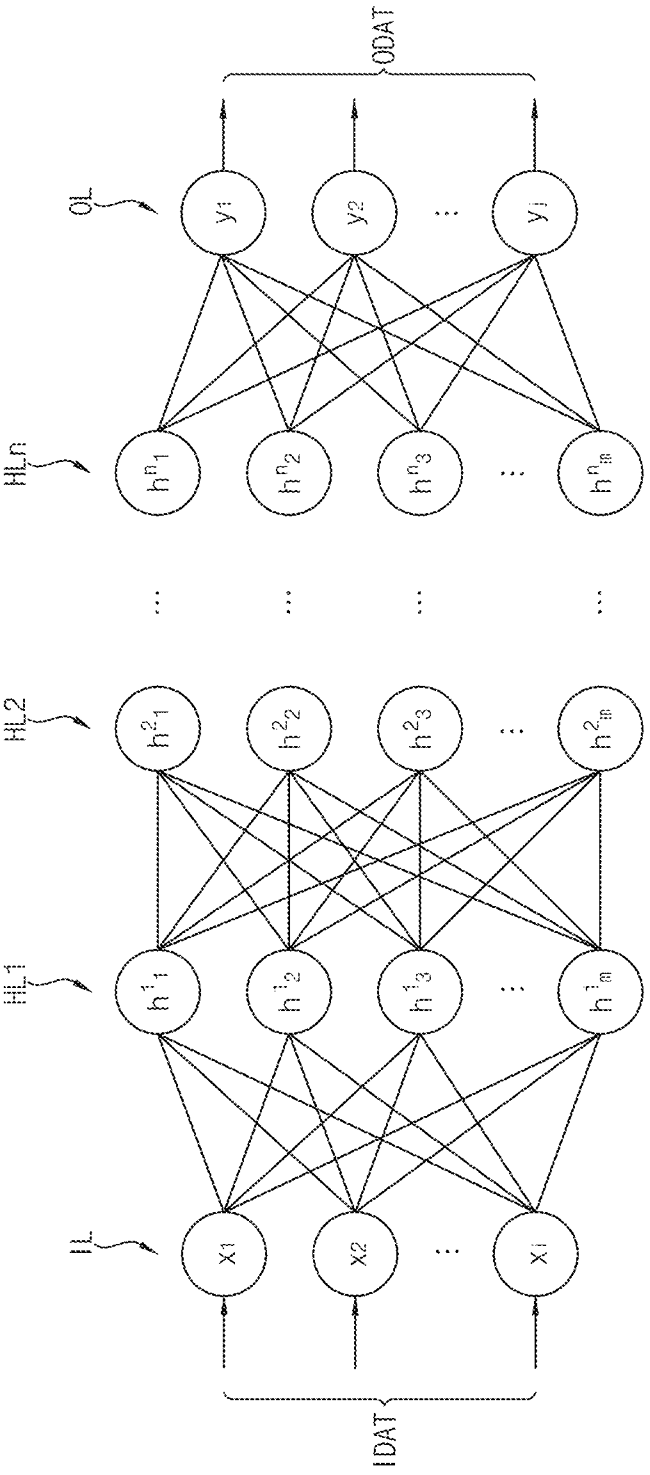

FIG. 5A illustrates an example of a general neural network (or artificial neural network). For example, the general neural network may include an input layer IL, a plurality of hidden layers HL1, HL2, . . . , HLn and an output layer OL.

The input layer IL may include i input nodes $x_1$, $x_2$, . . . , $x_i$, where i is a positive integer. Input data (e.g., vector input data) IDAT whose length is i may be input to the input nodes $x_1$, $x_2$, . . . , $x_1$ such that each element of the input data IDAT is input to a respective one of the input nodes $x_1$, $x_2$, . . . , $x_1$. The input data IDAT may include information associated with the various features of the different classes to be categorized.

The plurality of hidden layers HL1, HL2, . . . , HLn may include n hidden layers, where n is a positive integer, and may include a plurality of hidden nodes $h^1_1$, $h^1_2$, $h^1_3$, . . . , $h^1_m$, $h^2_1$, $h^2_2$, $h^2_3$, . . . , $h^2_m$, $h''_1$, $h''_2$, $h''_3$, . . . , $h''_m$. For example, the hidden layer HL1 may include m hidden nodes $h^1_1$, $h^1_2$, $h^1_3$, . . . , $h^1_m$, the hidden layer HL2 may include m hidden nodes $h''_1$, $h''_2$, $h''_3$, . . . , $h''_m$, and the hidden layer HLn may include m hidden nodes $h''_1$, $h''_2$, $h''_3$, . . . , $h''_m$, where m is a positive integer.

The output layer OL may include j output nodes $y_1$, $y_2$, . . . , $y_j$, where j is a positive integer. Each of the output nodes $y_1$, $y_2$, . . . , $y_j$ may correspond to a respective one of classes to be categorized. The output layer OL may generate output values (e.g., class scores or numerical output such as a regression variable) and/or output data ODAT associated with the input data IDAT for each of the classes. In some implementations, the output layer OL may be a fully-connected layer and may indicate, for example, a probability that the input data IDAT corresponds to a car.

A structure of the neural network illustrated in FIG. 5A may be represented by information on branches (or connections) between nodes illustrated as lines, and a weighted value assigned to each branch, which is not illustrated. In some neural network models, nodes within one layer may not be connected to one another, but nodes of different layers may be fully or partially connected to one another. In some other neural network models, such as unrestricted Boltzmann machines, at least some nodes within one layer may also be connected to other nodes within one layer in addition to (or alternatively with) one or more nodes of other layers.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function. This function may be called the activation function for the node.

In some implementations, the structure of the neural network is set in advance, and the weighted values for the connections between the nodes are set appropriately by using sample data having sample answer (also referred to as a "label"), which indicates a class the data corresponding to a sample input value. The data with the sample answer may be referred to as "training data", and a process of determining the weighted values may be referred to as "training". The neural network "learns" to associate the data with corresponding labels during the training process. A group of an independently trainable neural network structure and the weighted values that have been trained using an algorithm may be referred to as a "model", and a process of predicting, by the model with the determined weighted values, which class new input data belongs to, and then outputting the predicted value, may be referred to as a "testing" process or operating the neural network in inference mode.

Figure 5B:
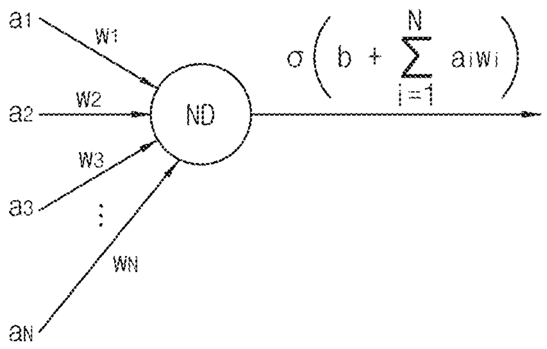

FIG. 5B illustrates an example of an operation (e.g., computation or calculation) performed by one node ND included in the neural network of FIG. 5A.

Based on N inputs $a_1, a_2, a_3, \ldots, a_N$ provided to the node ND, where N is a positive integer greater than or equal to two, the node ND may multiply the N inputs $a_1$ to $a_N$ and corresponding N weights $w_1, w_2, w_3, \ldots, w_N$, respectively, may sum N values obtained by the multiplication, may add an offset "b" to a summed value, and may generate one output value (e.g., "z") by applying a value to which the offset "b" is added to a specific function "a".

In some implementations and as illustrated in FIG. 5B, one layer included in the neural network illustrated in FIG. 5A may include M nodes ND, where M is a positive integer greater than or equal to two, and output values of the one layer may be obtained by Equation 1.

$$W * A = Z \qquad \text{[Equation 1]}$$

In Equation 1, "W" denotes a weight set including weights for all connections included in the one layer, and may be implemented in an M*N matrix form. "A" denotes an input set including the N inputs $a_1$ to $a_N$ received by the one layer, and may be implemented in an N*1 matrix form. "Z" denotes an output set including M outputs $z_1, z_2, z_3, \ldots, z_M$ output from the one layer, and may be implemented in an M*1 matrix form.

The general neural network illustrated in FIG. 5A may not be suitable for handling input image data (or input sound data) because each node (e.g., the node $h^1_1$) is connected to all nodes of a previous layer (e.g., the nodes $x_1, x_2, \ldots, x_i$ included in the layer IL) and then the number of weighted values drastically increases as the size of the input image data increases. Thus, a convolutional neural network (CNN), which is implemented by combining the filtering technique with the general neural network, has been researched such that a two-dimensional image, as an example of the input image data, is efficiently trained by the convolutional neural network.

Figure 5C:
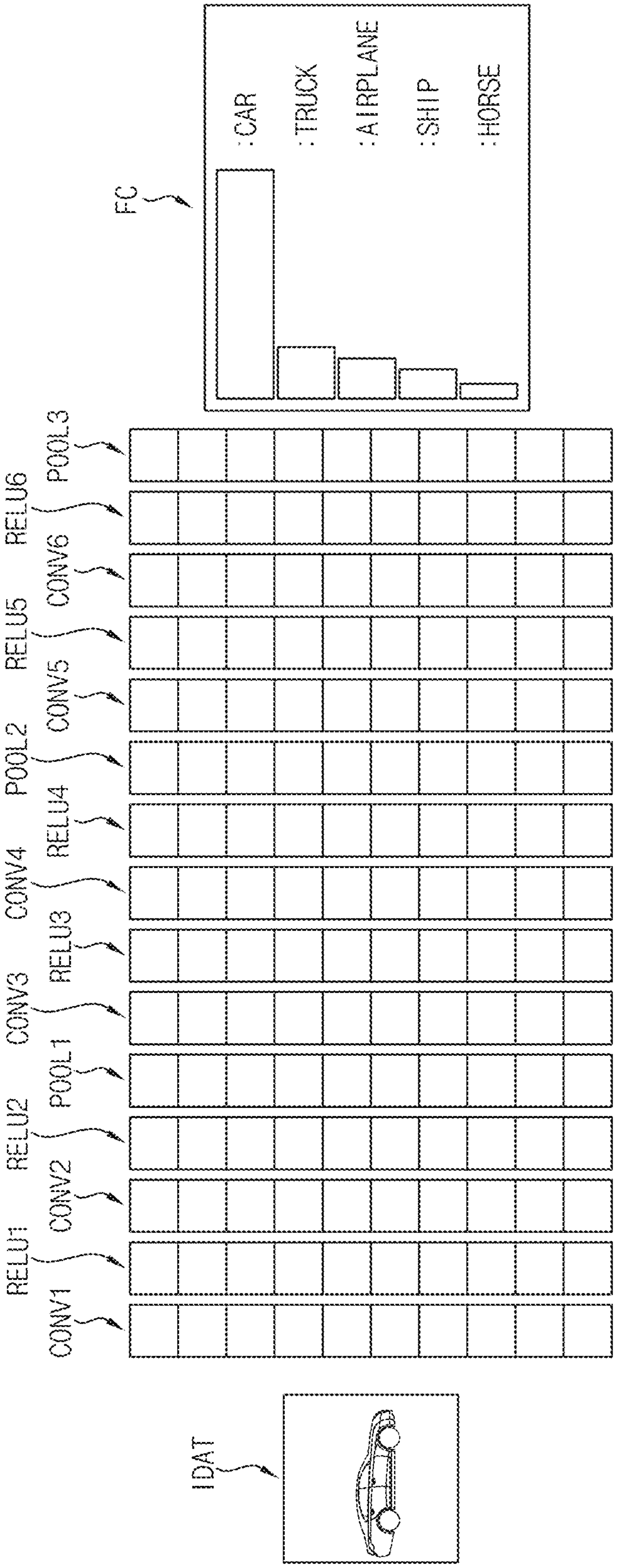

FIG. 5C illustrates an example of a convolutional neural network. For example, the convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and FC. Here, "CONV" denotes a convolutional layer, "RELU" denotes a rectified linear unit activation function, "POOL" denotes a pooling layer, and "FC" denotes a fully connected layer.

Unlike the general neural network, each layer of the convolutional neural network may have three dimensions of a width, a height and a depth, and thus data that is input to each layer may be volume data having three dimensions of a width, a height and a depth. For example, if an input image in FIG. 5C has a size of 32 widths (e.g., 32 pixels) and 32 heights and three color channels R, G and B, input data IDAT corresponding to the input image may have a size of 32*32*3. The input data IDAT in FIG. 5C may be referred to as input volume data or input activation volume.

Each of the convolutional layers CONV1, CONV2, CONV3, CONV4, CONV5 and CONV6 may perform a convolutional operation on input volume data. In an image processing operation, the convolutional operation represents an operation in which image data is processed based on a mask with weighted values and an output value is obtained by multiplying input values by the weighted values and adding up the total multiplication results. The mask may be referred to as a filter, a window, or a kernel.

Parameters of each convolutional layer may include a set of learnable filters. Every filter may be small spatially (along a width and a height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map corresponding to responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of the RELU layers RELU1, RELU2, RELU3, RELU4, RELU5 and RELU6 may perform a rectified linear unit (RELU) operation that corresponds to an activation function defined by, e.g., a function $f(x)=\max(0, x)$ (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of the pooling layers POOL1, POOL2 and POOL3 may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., a width and a height of volume data decreases, and a depth of volume data is maintained).

Typically, convolutional layers may be repeatedly arranged in the convolutional neural network, and the pooling layer may be periodically inserted in the convolutional neural network, thereby reducing a spatial size of an image and extracting a characteristic of the image.

The output layer or fully connected layer FC may output results (e.g., class scores) of the input volume data IDAT for each of the classes. For example, the input volume data IDAT corresponding to the two-dimensional image may be converted into a one-dimensional matrix or vector, which may be referred to as an embedding, as the convolutional operation and the down-sampling operation are repeated. For example, the fully connected layer FC may indicate probabilities that the input volume data IDAT corresponds to a car, a truck, an airplane, a ship and a horse.

The types and number of layers included in the convolutional neural network may not be limited to an example described with reference to FIG. 5C and may be variously determined. In addition, although not illustrated in FIG. 5C, the convolutional neural network may further include other layers such as a softmax layer for converting score values corresponding to predicted results into probability values, a bias adding layer for adding at least one bias, or the like. The bias may also be incorporated into the activation function.

Figure 5D:
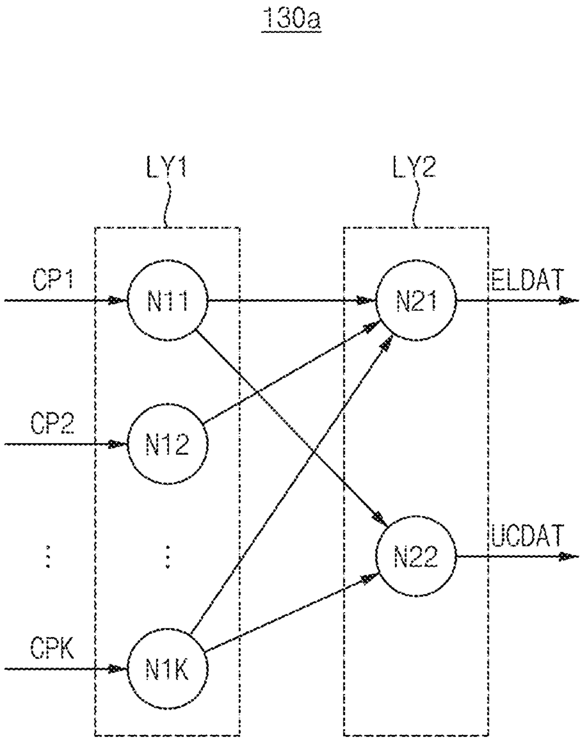

FIG. 5D illustrates an example of the post computing block 130. For example, a post computing block 130*a* may include a first layer LY1 and a second layer LY2.

The first layer LY1 may include a plurality of nodes N11, N12, . . . , N1K, and the second layer LY2 may include a plurality of nodes N21 and N22. For example, the first layer LY1 may be a sigmoid layer that uses a sigmoid function as an activation function. For example, the second layer LY2 may be a linear sum layer that performs a linear sum operation. However, the layers LY1 and LY2 are not limited thereto.

In addition, example implementations may not be limited to specific neural networks, and may be applied or employed to various other neural networks such as generative adversarial network (GAN), region with convolutional neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzman machine (RBM), fully convolutional network, long short-term memory (LSTM) Network. Alternatively or additionally, the neural network may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests.

Figure 6:
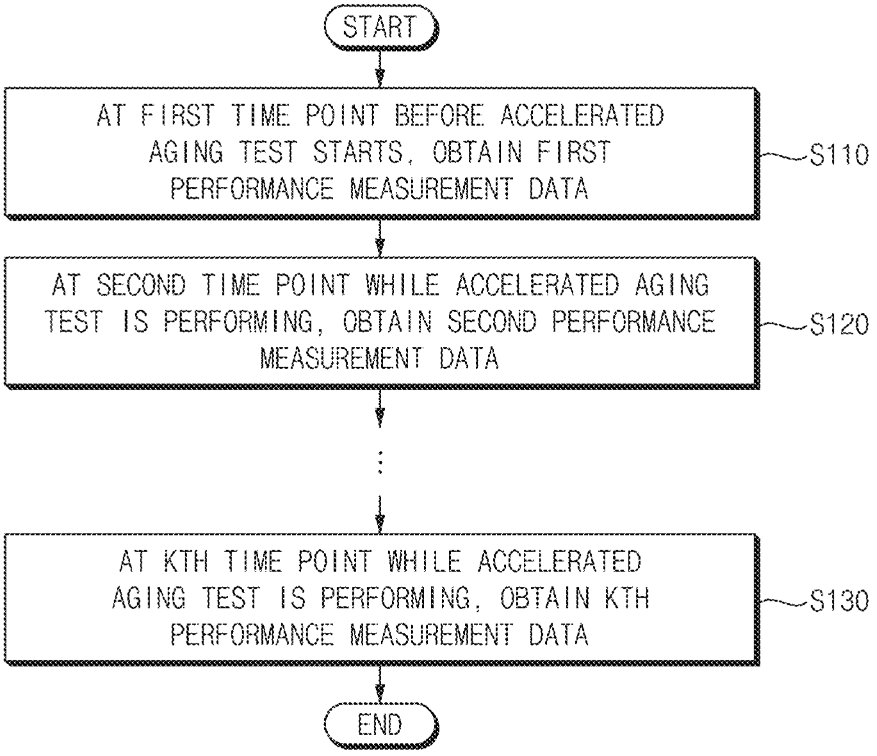
FIG. 6 is a flowchart illustrating an example of obtaining a plurality of performance measurement data in FIG. 1.
Figure 7:
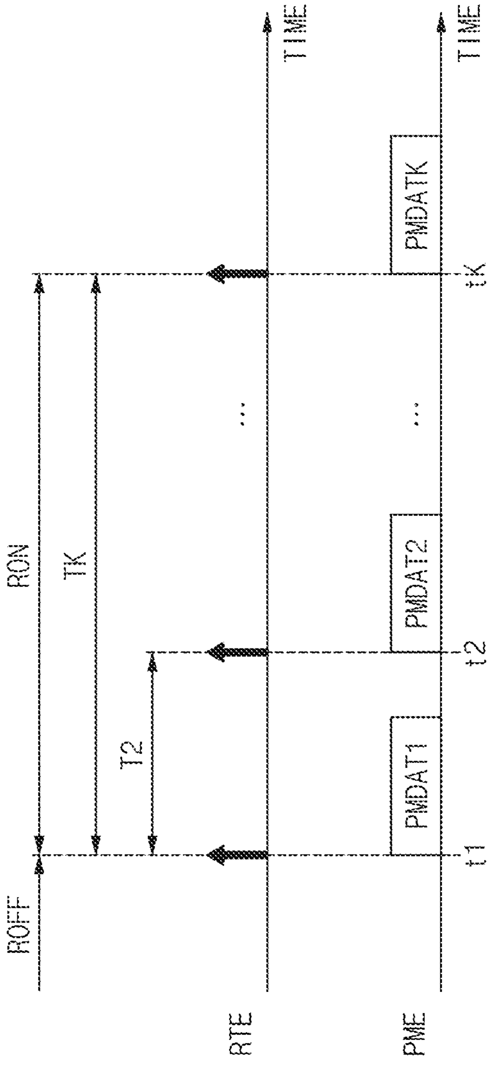
FIGS. 7, 8, and 9 are diagrams for describing an example operation of FIG. 6.
Figures 8, 9:
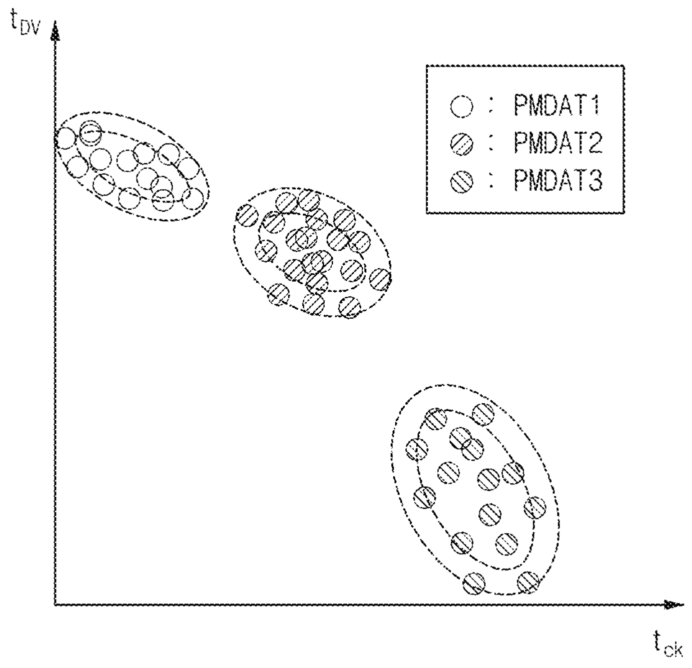

FIG. 6 is a flowchart illustrating an example of obtaining a plurality of performance measurement data in FIG. 1. FIGS. 7, 8, and 9 are diagrams for describing an example operation of FIG. 6.

Referring to FIGS. 1, 4, 6 and 7, in operation S100, at first time point t1 before the accelerated aging test starts, the first performance measurement data PMDAT1 associated with the plurality of performances of the plurality of unused memory devices may be obtained (operation S110). At second time point t2 after the first time point t1 while the accelerated aging test is performing, the second performance measurement data PMDAT2 associated with the plurality of performances of the plurality of unused memory devices may be obtained (operation S120). At Kth time point tK after the second time point t2 while the accelerated aging test is performing, the Kth performance measurement data PMDATK associated with the plurality of performances of the plurality of unused memory devices may be obtained (operation S130).

In FIG. 7, "RTE" may represent an operation using the reliability testing equipment 1400, e.g., an operation of performing the accelerated aging test, and "PME" may represent data measurement and collection operations using the performance measuring equipment 1500 and the data collection module 1310. Arrows illustrated on "RTE" may represent performance measurement events that occur while the accelerated aging test is performing.

The accelerated aging test is a test that uses aggravated conditions of heat, humidity, oxygen, sunlight, vibration, etc. to speed up the normal aging processes of items. The accelerated aging test may be used to help determine the long-term effects of expected levels of stress within a shorter time, usually in a laboratory by controlled standard test methods. The accelerated aging test may be used to estimate the useful lifespan of a product or its shelf life when actual lifespan data is unavailable.

In some implementations, the HTOL test may be performed as the accelerated aging test. The HTOL test is a reliability test applied to integrated circuits (ICs) to determine their intrinsic reliability. The HTOL test may stress the IC at an elevated temperature, high voltage and dynamic operation for a predefined period of time. The IC may be usually monitored under stress and tested at intermediate intervals. The HTOL test may be referred to as a lifetime test, device life test or extended burn in test and may be used to trigger potential failure modes and assess IC lifetime.

At the first time point t1 and before the first time point t1, the reliability testing equipment 1400 may not operate (e.g., may have an off-state ROFF), and it may represent a state before starting the accelerated aging test. In other words, the first time point t1 may represent a state in which the accelerated aging test has been performed during first time interval (e.g., for zero hour). The first performance measurement data PMDAT1 for the plurality of unused memory devices, which are measured using the performance measuring equipment 1500 and the data collection module 1310 at the first time point t1, may represent initial performance of the plurality of unused memory devices.

After the first time point t1, the reliability test equipment 1400 may operate (e.g., may have an on-state RON) to start the accelerated aging test. The performance of the plurality of unused memory devices may be measured at specific time points while performing the accelerated aging test.

The second time point t2 may represent a state in which the accelerated aging test has been performed during second time interval T2. At the second time point t2, the second performance measurement data PMDAT2 for the plurality of unused memory devices may be obtained using the performance measuring equipment 1500 and the data collection module 1310. The Kth time point tK may represent a state in which the accelerated aging test has been performed during Kth time interval TK. At the Kth time point tK, the Kth performance measurement data PMDATK for the plurality of unused memory devices may be obtained using the performance measuring equipment 1500 and the data collection module 1310.

Referring to FIG. 8, an example of the plurality of performance measurement data PMDAT1 to PMDATK is illustrated.

In some implementations, the plurality of performances of the plurality of unused memory devices may include first performances PF1 to Lth performances PFL that are different from each other, where L is a positive integer greater than or equal to two. For example, the plurality of performances PF1 to PFL may be performances associated with the I/O timings of the plurality of unused memory devices. For example, when each of the plurality of unused memory devices is a DRAM device, the plurality of performances PF1 to PFL may include first performance $t_{CK}$, second performance $t_{DV}$, third performance $t_{PD}$, fourth performance, etc. For example, the first performance $t_{CK}$ may represent the minimum cycle of the clock signal required for the DRAM to operate normally, the second performance $t_{DV}$ may represent a size of the data valid window, the third performance $t_{PD}$ may represent the propagation delay, and the fourth performance may represent the duty ratio of the clock signal. However, example implementations are not limited thereto. For example, the plurality of performances PF1 to PFL may include at least some of all possible performance parameters, and performance parameters with a relatively large change over time compared to the distribution of manufacturing process may be selected and used.

For example, the first performance measurement data PMDAT1, which are obtained at the first time point t1, may include first-first performance measurement data PMDAT1-1 associated with the first performance PF1 of the plurality of unused memory devices to first-Lth performance measurement data PMDAT1-L associated with the Lth performance PFL of the plurality of unused memory devices. Similarly, the second performance measurement data PMDAT2 may include second-first performance measurement data PMDAT2-1 associated with the first performance PF1 to second-Lth performance measurement data PMDAT2-L associated with the Lth performance PFL. The Kth performance measurement data PMDATK may include Kth-first performance measurement data PMDATK-1 associated with the first performance PF1 to Kth-Lth performance measurement data PMDATK-L associated with the Lth performance PFL.

Referring to FIG. 9, an example where K=3 and L=2 is illustrated. For example, FIG. 9 illustrates three performance measurement data PMDAT1, PMDAT2 and PMDAT3 that are obtained by measuring two different performances $t_{CK}$ and $t_{DV}$ of the plurality of unused memory devices at three different time points. For example, as the accelerated aging test is performed on the plurality of unused memory devices (e.g., as the used lifetime of the DRAMs increases), the first performance $t_{CK}$ representing the minimum cycle of the clock signal may increase, and the second performance $t_D$V representing the size of the data valid window may decrease.

Figure 10:
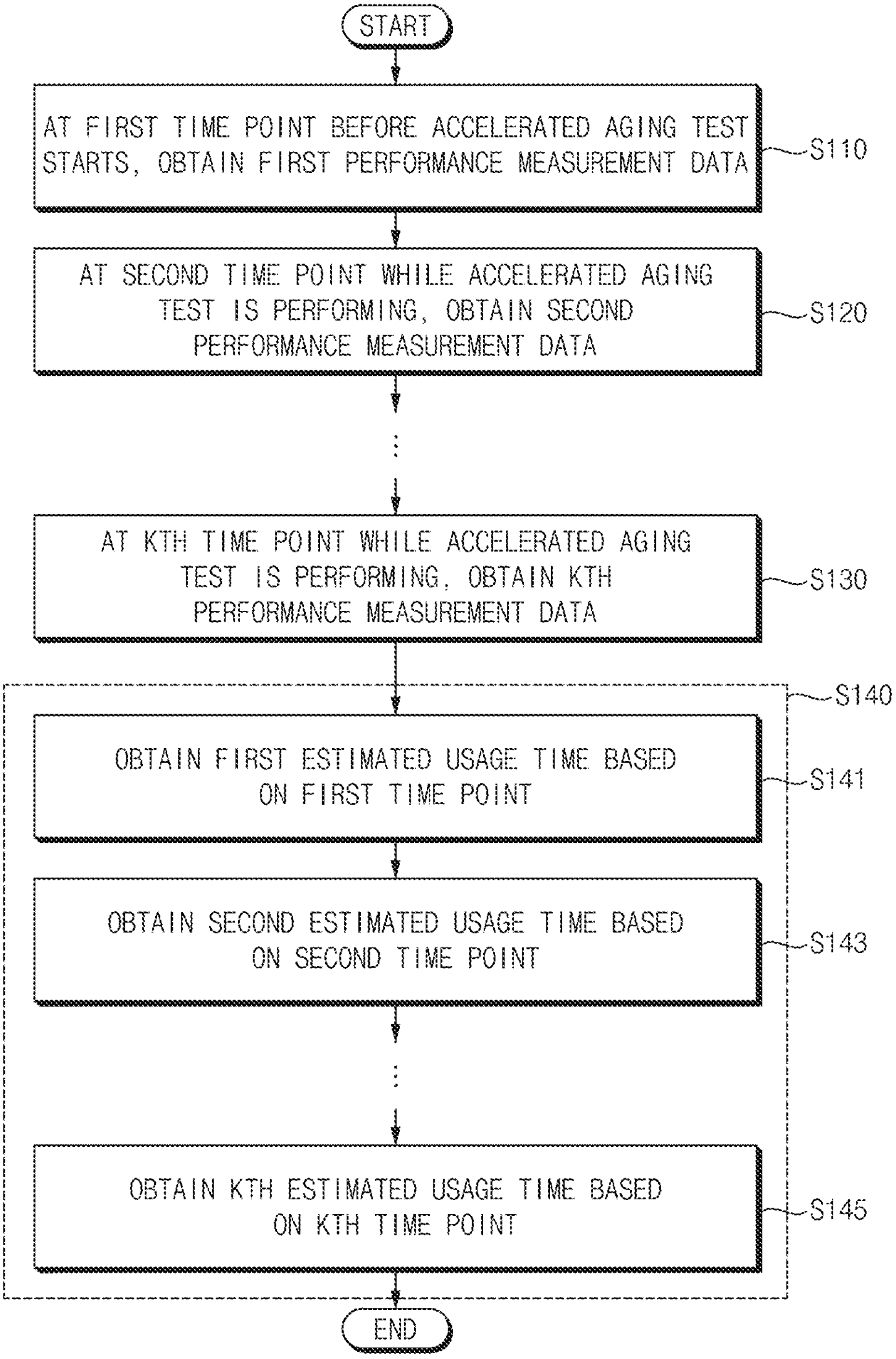
FIG. 10 is a flowchart illustrating an example of obtaining a plurality of performance measurement data in FIG. 1.

FIG. 10 is a flowchart illustrating an example of obtaining a plurality of performance measurement data in FIG. 1. The descriptions repeated with or overlapping with descriptions of FIG. 6 will be omitted in the interest of brevity.

Referring to FIGS. 1, 7 and 10, in operation S100, operations S110, S120 and S130 may be substantially the same as those described with reference to FIG. 6.

Thereafter, a plurality of estimated usage times of the plurality of unused memory devices may be obtained (operation S140). Each of the plurality of estimated usage times may correspond to a respective one of the first time point t1 to the Kth time point tK. In other words, time experienced by the product under the accelerated conditions may be converted into time expected to be experienced by the product under the actual use conditions.

For example, first estimated usage time of the plurality of unused memory devices may be obtained based on the first time point t1 (operation S141), second estimated usage time of the plurality of unused memory devices may be obtained based on the second time point t2 (operation S143), and Kth estimated usage time of the plurality of unused memory devices may be obtained based on the Kth time point tK (operation S145). For example, the first estimated usage time may correspond to the first time interval (e.g., zero hour) during which the accelerated aging test was performed, the second estimated usage time may correspond to the second time interval T2 during which the accelerated aging test was performed, and the Kth estimated usage time may correspond to the Kth time interval TK during which the accelerated aging test was performed.

In some implementations, the first to Kth estimated usage times may be calculated using the Arrhenius equation and/or at least one of various transformation equations obtained empirically.

As a result, the first performance measurement data PMDAT1 obtained at the first time point t1 may be treated or handled as performance parameters obtained when the plurality of unused memory devices will be used for the first estimated usage time under the actual use conditions (e.g., obtained when the plurality of unused memory devices are not used).

Similarly, the second performance measurement data PMDAT2 may be treated as performance parameters obtained when the plurality of unused memory devices will be used for the second estimated usage time under the actual use conditions, and the Kth performance measurement data PMDATK may be treated as performance parameters obtained when the plurality of unused memory devices will be used for the Kth estimated usage time under the actual use conditions.

Although FIG. 10 illustrates that operation S140 is performed after operations S110, S120 and S130, example implementations are not limited thereto. For example, operation S141 may be performed after operation S110, operation S143 may be performed after operation S120, and operation S145 may be performed after operation S130.

Figure 11:
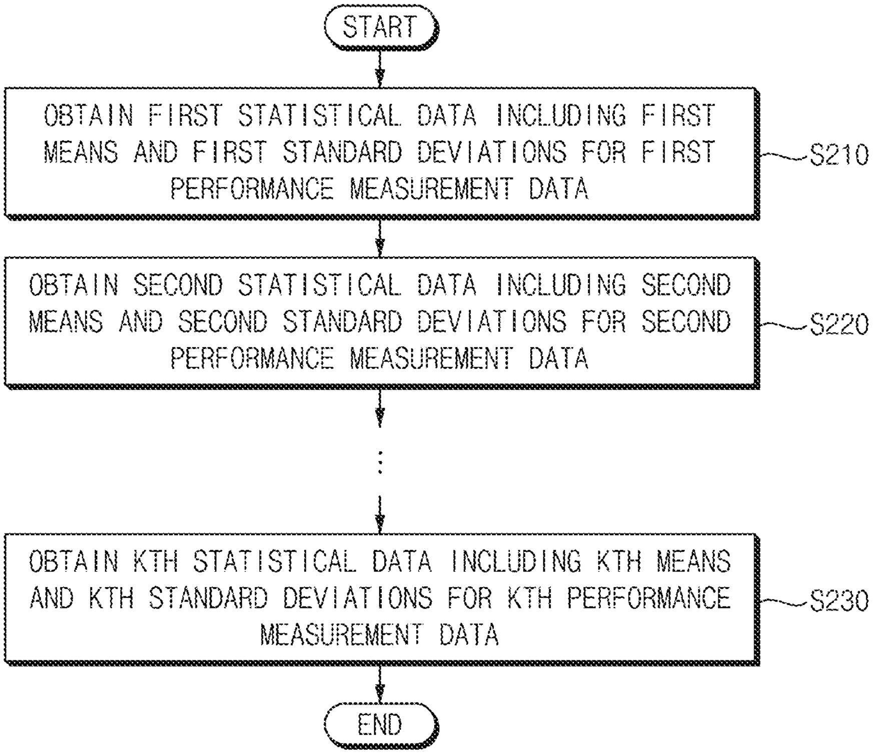
FIG. 11 is a flowchart illustrating an example of calculating a plurality of statistical data in FIG. 1.

FIG. 11 is a flowchart illustrating an example of calculating a plurality of statistical data in FIG. 1.

Referring to FIGS. 1, 4 and 11, in operation S200, the first statistical data STDAT1 including first means and first standard deviations for the first performance measurement data PMDAT1 may be obtained (operation S210), the second statistical data STDAT2 including second means and second standard deviations for the second performance measurement data PMDAT2 may be obtained (operation S220), and the Kth statistical data STDATK including Kth means and Kth standard deviations for the Kth performance measurement data PMDATK may be obtained (operation S230). For example, each statistical data may be obtained as in Equation 2.

$$STDAT = N\left(\mu, \sum\right) \quad \text{[Equation 2]}$$

In Equation 2, "μ" and "Σ" denote means and standard deviations, respectively, and may be obtained by performing probability distribution fitting (or data fitting) by assuming that each performance measurement data follows a normal distribution. For example, a K-dimensional Gaussian distribution may be formed by the first to Kth statistical data STDAT1 to STDATK.

However, example implementations are not limited thereto. For example, "μ" may denote means, and "Σ" may denote standard deviations and covariances. For example, if "Σ" denotes only standard deviations, there may be no correlation between performance measurement data. For example, if "Σ" denotes standard deviations and covariances, there may be correlation between performance measurement data. In an example where "I" denotes standard deviations and covariances, the first statistical data STDAT1 obtained in operation S210 may include first means, first standard deviations and first covariances, the second statistical data STDAT2 obtained in operation S220 may include second means, second standard deviations and second covariances, and the Kth statistical data STDATK obtained in operation S230 may include Kth means, Kth standard deviations and Kth covariances.

In some implementations, when the plurality of performance measurement data PMDAT1 to PMDATK are implemented as illustrated in FIG. 8, μ and Σ may be obtained in the form of L*1 vector and L*L matrix, respectively. For example, in the first statistical data STDAT1 obtained based on the first performance measurement data PMDAT1, the first means (e.g., "μ") may be represented in the form of L*1 vector that includes a mean of the first-first performance measurement data PMDAT1-1 to a mean of the first-Lth performance measurement data PMDAT1-L, and the first standard deviations (e.g., "Σ") may be represented in the form of L*L matrix that includes standard deviations of the first-first performance measurement data PMDAT1-1 to standard deviations of the first-Lth performance measurement data PMDAT1-L.

Although FIG. 11 illustrates that operations S210, S220 and S230 are performed sequentially, example implementations are not limited thereto. For example, at least some or all of operations S210, S220 and S230 may be performed in parallel (e.g., substantially simultaneously).

Figure 12:
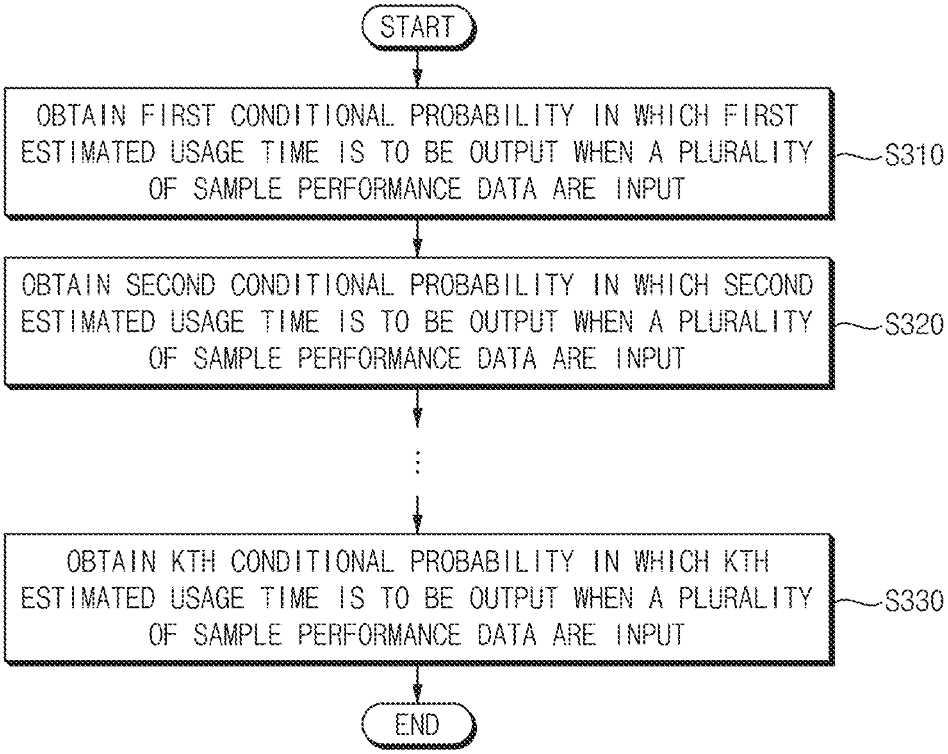
FIG. 12 is a flowchart illustrating an example of calculating a plurality of conditional probabilities in FIG. 1.

FIG. 12 is a flowchart illustrating an example of calculating a plurality of conditional probabilities in FIG. 1.

Referring to FIGS. 1, 4 and 12, in operation S300, the first conditional probability CP1 in which the first estimated usage time corresponding to the first performance measurement data PMDAT1 and the first statistical data STDAT1 is to be output when the plurality of sample performance data SPDAT are input may be obtained (operation S310), the second conditional probability CP2 in which the second estimated usage time corresponding to the second performance measurement data PMDAT2 and the second statistical data STDAT2 is to be output when the plurality of sample performance data SPDAT are input may be obtained (operation S320), and the Kth conditional probability CPK in which the Kth estimated usage time corresponding to the Kth performance measurement data PMDATK and the Kth statistical data STDATK is to be output when the plurality of sample performance data SPDAT are input may be obtained (operation S330). For example, each conditional probability may be obtained as in Equation 3.

$$CP = P(yr|Tx) \quad \text{[Equation 3]}$$

In Equation 3, "yr" and "Tx" denote estimated usage time and sample performance data, respectively, and a probability in which a memory device has been used for the estimated usage time "yr" under the actual use conditions may be calculated when specific performance parameters (e.g., the sample performance data "Tx") of the memory device are measured. For example, the estimated usage time "yr" may be represented in units of the number of years. For example, the sample performance data "Tx" may include L performance values associated with the first to Lth performances PF1 to PFL, similarly to each performance measurement data.

Although FIG. 12 illustrates that operations S310, S320 and S330 are performed sequentially, example implementations are not limited thereto. For example, at least some or all of operations S310, S320 and S330 may be performed in parallel (e.g., substantially simultaneously).

Thereafter, the process of training the lifetime calculation model 100 in operation S400 may be performed based on a widely-known scheme in the art. For example, when the lifetime calculation model 100 is to be trained, the plurality of sample performance data SPDAT and sample usage time data, which is ground truth (or correct answer information) for the plurality of sample performance data SPDAT, may be prepared. Thereafter, the estimated used lifetime data ELDAT may be obtained by applying the plurality of sample performance data SPDAT to the lifetime calculation model 100 (e.g., by inputting the plurality of sample performance data SPDAT to the lifetime calculation model 100 and by sequentially performing a plurality of computing operations on the plurality of sample performance data SPDAT). Thereafter, a consistency of the lifetime calculation model 100 may be checked by comparing the sample usage time data with the estimated used lifetime data ELDAT.

In some implementations, the lifetime calculation model 100 may be trained by updating tuning parameters and/or hyper parameters included in the lifetime calculation model 100.

In some implementations, the lifetime calculation model 100 may be trained by performing a forward propagation process and a backpropagation process on the lifetime calculation model 100. The forward propagation may be a portion of procedures while the training operation is performed, and the backpropagation may be another portion of procedures performed while the training operation is performed. The forward propagation may represent a process of calculating output (or output data) by passing input (or input data) through the lifetime calculation model 100 in a forward direction. The backpropagation may represent a process of calculating loss by comparing the output with a label, which is ground truth obtained in advance, a process of calculating a gradient for the weights such that the loss is reduced by passing the calculated loss through the lifetime calculation model 100 in a reverse direction, and a process of updating the weights. The backpropagation may be referred to as an error backpropagation.

In some implementations, as the lifetime calculation model 100 is trained, a plurality of weights included in the lifetime calculation model 100 may be updated.

Figure 13:
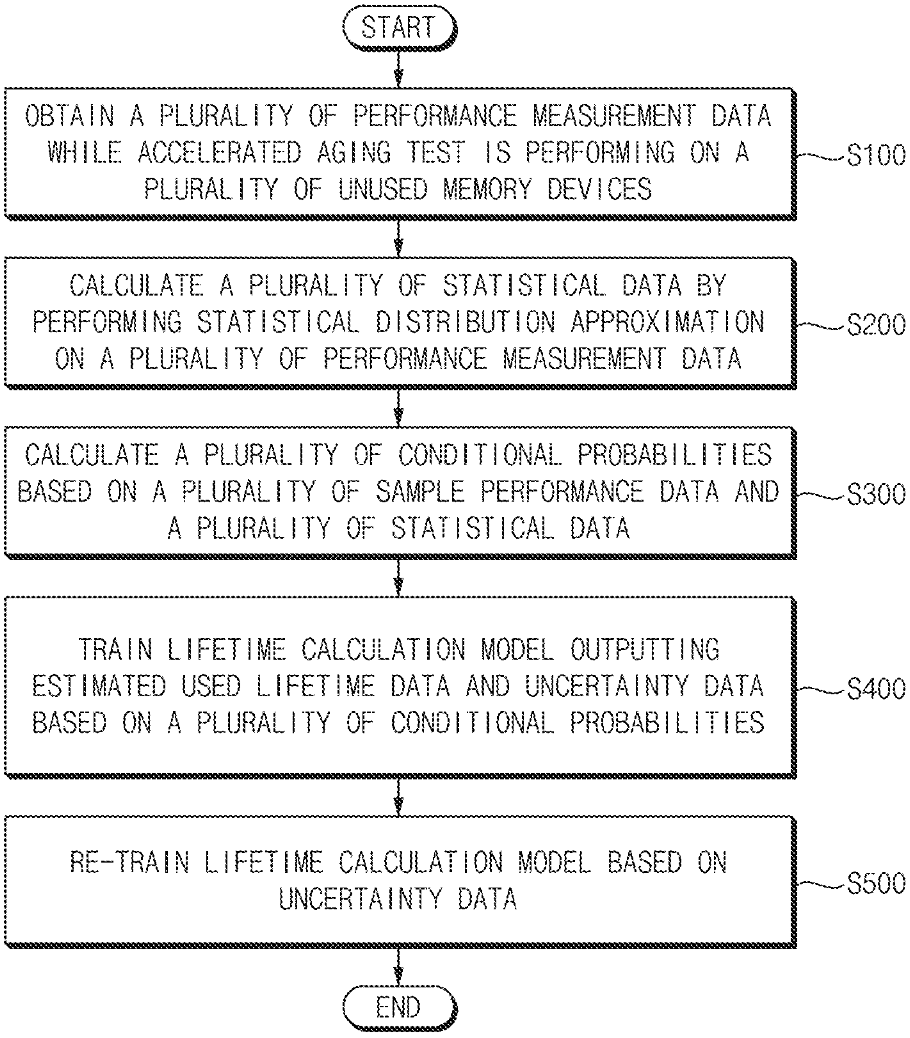
FIG. 13 is a flowchart illustrating an example of a modeling method for estimating used lifetime of a memory device.

FIG. 13 is a flowchart illustrating an example of a modeling method for estimating used lifetime of a memory device. The descriptions repeated with or overlapping with descriptions of FIG. 1 will be omitted in the interest of brevity.

Referring to FIG. 13, in a modeling method, operations S100, S200, S300 and S400 may be substantially the same as those described with reference to FIG. 1.

Thereafter, the lifetime calculation model may be re-trained based on the uncertainty data output from the lifetime calculation model (operation S500). For example, the uncertainty of estimation may be quantified. For example, the validity of the lifetime calculation model may be verified based on the uncertainty of estimation, and the uncertainty of estimation may be used as an indicator of the potential errors in the measurement process. In other words, when the consistency of the lifetime calculation model does not reach a target consistency, the lifetime calculation model may be re-trained, which will be described with reference to FIGS. 14 and 15.

Although FIG. 13 illustrates that operation S500 is performed once, example implementations are not limited thereto. For example, operation S500 may be performed multiple times until the consistency of the lifetime calculation model reaches the target consistency.

Figure 14:
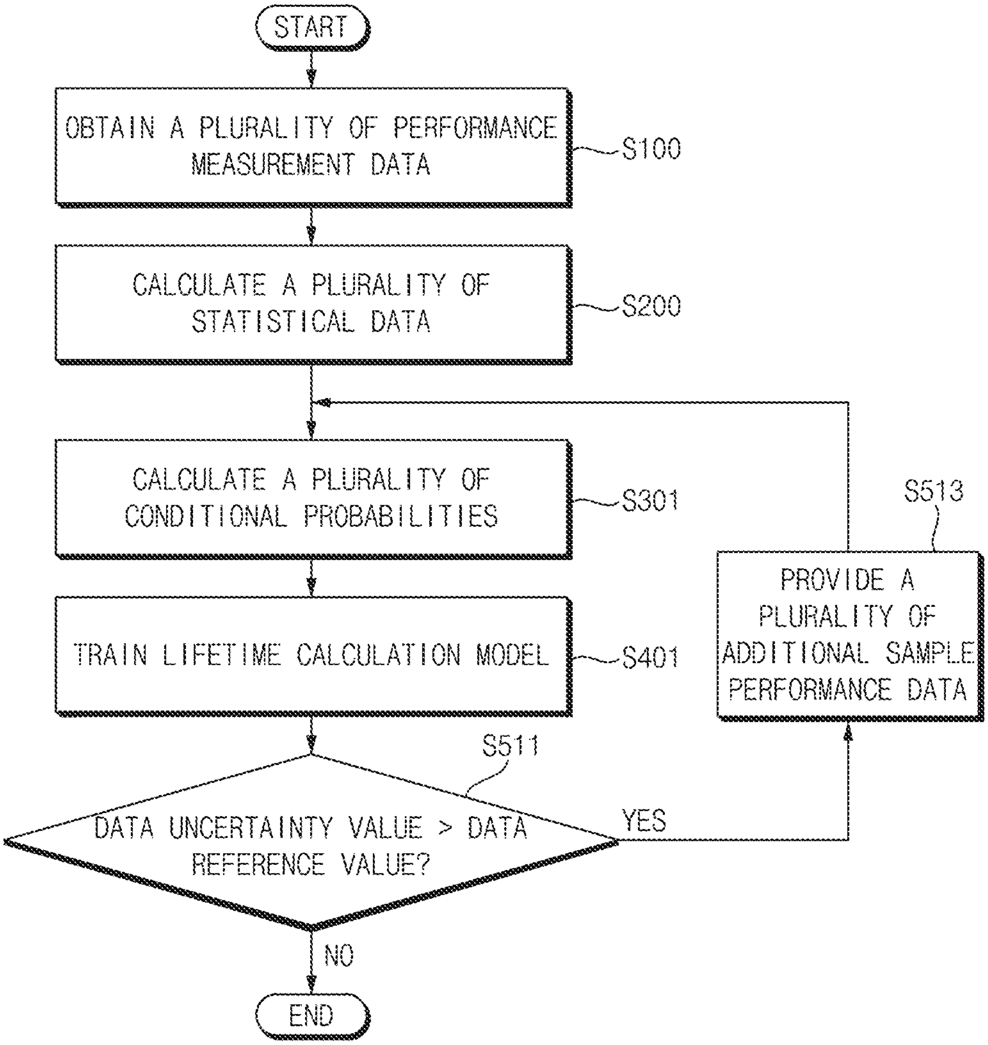
FIGS. 14 and 15 are flowcharts illustrating an example of a modeling method for estimating used lifetime of a memory device.
Figure 15:
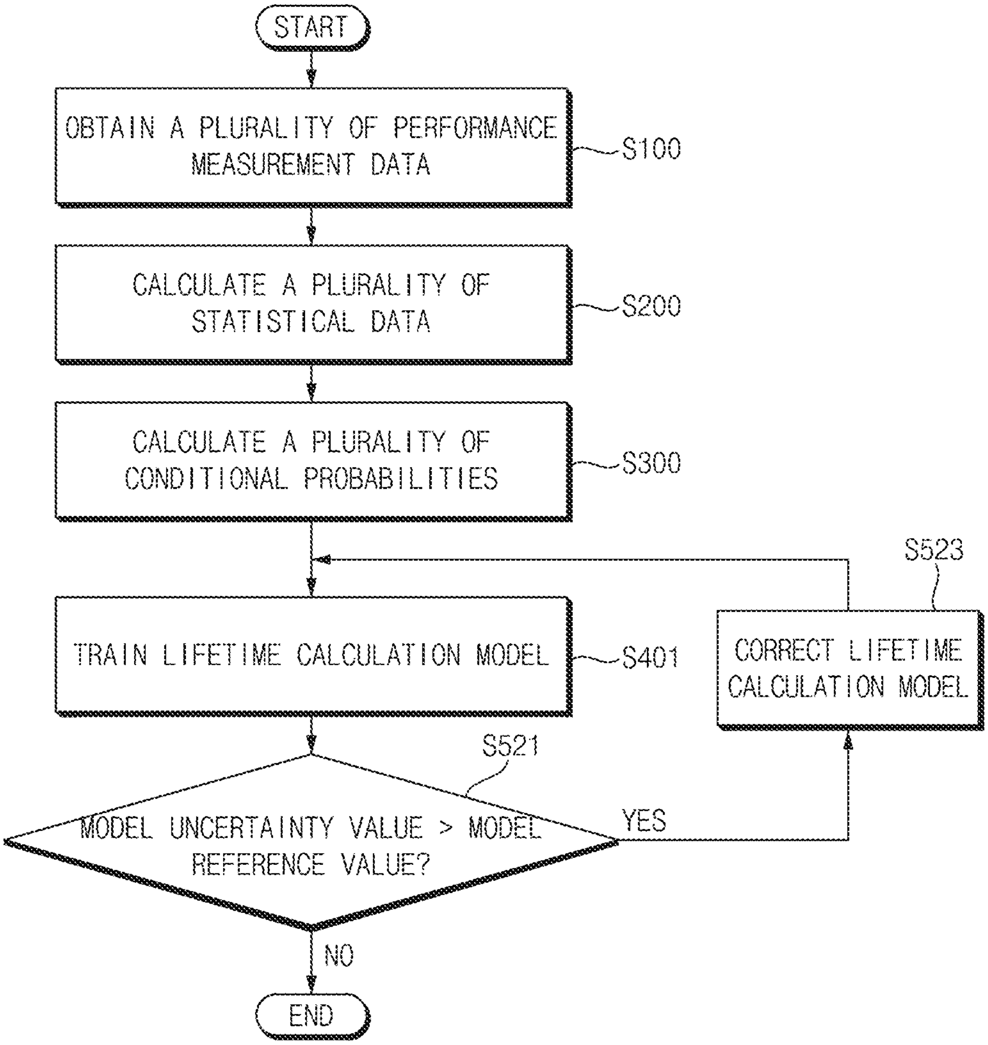

FIGS. 14 and 15 are flowcharts illustrating an example of a modeling method for estimating used lifetime of a memory device. The descriptions repeated with or overlapping with descriptions of FIGS. 1 and 13 will be omitted in the interest of brevity.

Referring to FIG. 14, in a modeling method, operations S100 and S200 may be substantially the same as those described with reference to FIG. 1, and operations S301 and S401 may be similar to operations S300 and S400 in FIG. 1, respectively.

In some implementations, the uncertainty data may include a data uncertainty value that represents or indicates the uncertainty of the estimated used lifetime data caused by noises of the plurality of sample performance data.

In operation S500, the data uncertainty value included in the uncertainty data may be compared with a data reference value (operation S511).

When the data uncertainty value is greater than the above data reference value (operation S511: YES), e.g., when the consistency of the lifetime calculation model does not reach the target consistency, a plurality of additional sample performance data different from (or other than) the plurality of sample performance data may be provided (operation S513), and the lifetime calculation model may be re-trained based on the plurality of additional sample performance data. For example, the plurality of conditional probabilities may be re-calculated by performing operation S301 based on the plurality of additional sample performance data, and the lifetime calculation model may be re-trained by performing operation S401 based on the plurality of re-calculated conditional probabilities. In this example, operations S301 and S401 that are performed first may be substantially the same as operations S300 and S400, and operations S301 and S401 that are performed after operations S511 and S513 may be a part of operation S500.

When the data uncertainty value is less than or equal to the data reference value (operation S511: NO), e.g., when the consistency of the lifetime calculation model reaches the target consistency, the process may be terminated without re-training the lifetime calculation model. In other words, the operation of re-training the lifetime calculation model may be performed repeatedly until the consistency of the lifetime calculation model reaches the target consistency.

Referring to FIG. 15, in a modeling method, operations S100, S200 and S300 may be substantially the same as those described with reference to FIG. 1, and operation S401 may be similar to operation S400 in FIG. 1.

In some implementations, the uncertainty data may include a model uncertainty value that represents or indicates the uncertainty of the estimated used lifetime data caused by errors and/or problems in the lifetime calculation model itself.

In operation S500, the model uncertainty value included in the uncertainty data may be compared with a model reference value (operation S521).

When the model uncertainty value is greater than the model reference value (operation S521: YES), e.g., when the consistency of the lifetime calculation model does not reach the target consistency, the lifetime calculation model may be corrected or modified (operation S523), and the corrected lifetime calculation model may be re-trained based on the plurality of sample performance data. For example, the lifetime calculation model may be corrected by changing hyperparameters, changing weights, changing layer structures, etc. in operation S523, and then the corrected lifetime calculation model may be re-trained by performing operation S401 based on the plurality of conditional probabilities of operation S300.

When the model uncertainty value is less than or equal to the model reference value (operation S521: NO), e.g., when the consistency of the lifetime calculation model reaches the target consistency, the process may be terminated without re-training the lifetime calculation model.

In some implementations, the uncertainty data may include both the data uncertainty value and the model reference value. In other words, example implementations may be implemented by combining the examples of FIGS. 14 and 15.

Figure 16B:
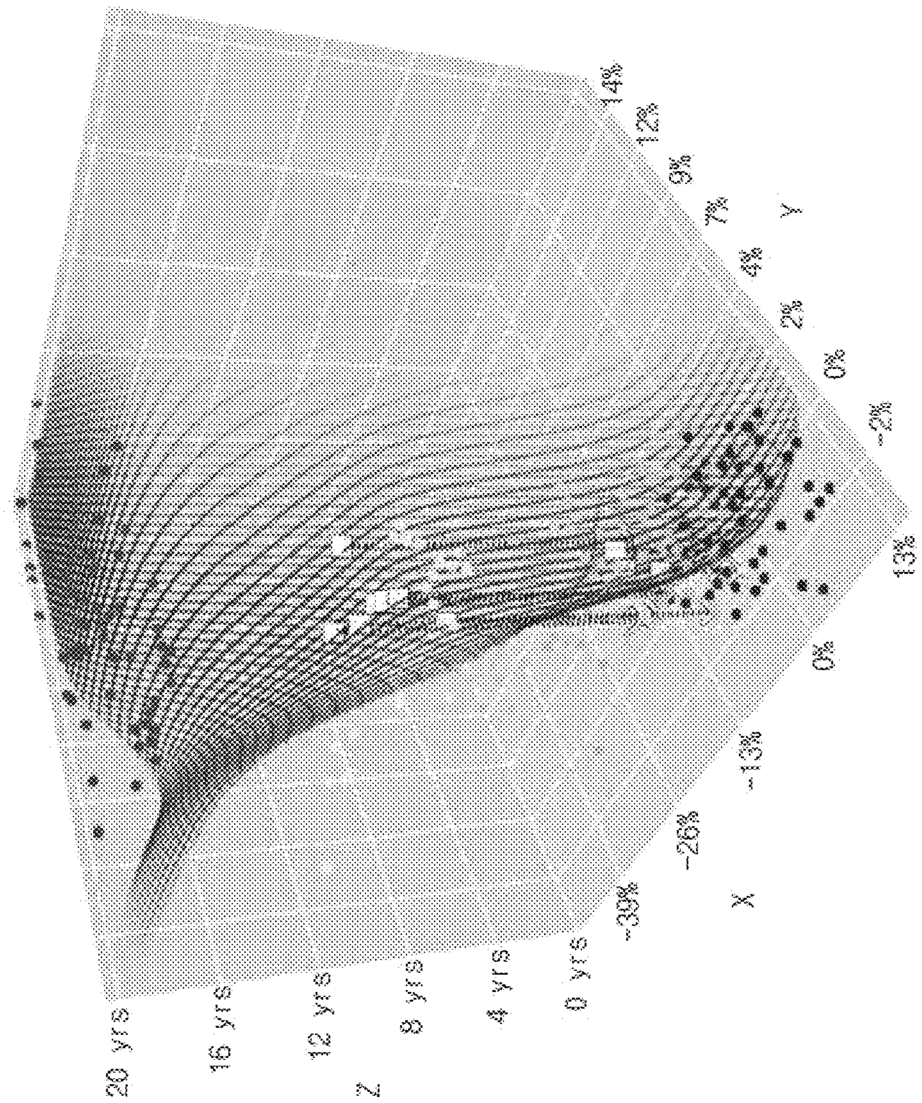
Figure 16C:
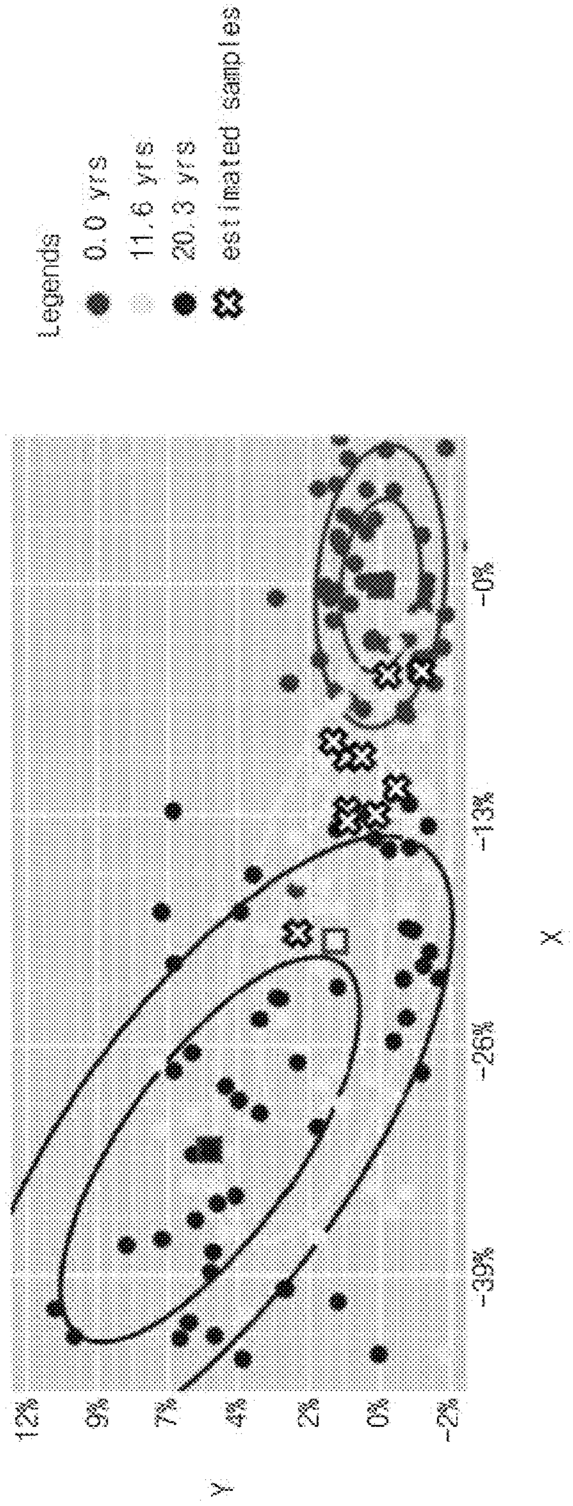

FIGS. 16A, 16B, and 16C are diagrams for describing an example of a modeling method for estimating used lifetime of a memory device.

Referring to FIG. 16A, an implementation example of a modeling method is illustrated. For example, "Given measurement values" stage, "stat. fittings" stage, "measured for unknown chip" stage, "conditional prob's & layers" stage, and "Final est. year" stage were executed. In the "Given measurement values" stage, the accelerated aging test was performed on sixty devices under test (DUTs), five different performance values were measured for each DUT at six different time points, and estimated usage times (e.g., years) corresponding to the six time points were obtained. Thereafter, in the "stat. fittings" stage, the "measured for unknown chip" stage, and the "conditional prob's & layers" stage, the statistical distribution approximation and the conditional probability calculation were performed, the sigmoid layer and the linear sum layer were executed. Thereafter, in the "Final est. year" stage, the lifetime calculation model for obtaining the estimated used lifetime was implemented. For example, model fitting (e.g., data training, parameter calibration, etc.) may be performed on "0".

Referring to FIGS. 16B and 16C, a simulation example of a modeling method is illustrated.

In FIG. 16B, an X-axis and a Y-axis represent measured performance values associated with the I/O timings of DRAM, and a Z-axis represents the number of used lifetime (e.g., used years). For example, the X-axis and the Y-axis may represent $t_D V$ and $t_{CK}$, respectively. In addition, points with the same color represent measured performance values corresponding to the same used years. FIG. 16C is a two-dimensional representation of the same information as FIG. 16B. In FIG. 16C, results of fitting the distribution of performance values corresponding to each used year to the normal distribution are illustrated as contour lines.

In FIG. 16B, curved lines represents estimated results from the lifetime calculation model generated based on such measured performance values (e.g., illustrated points). In other words, the curved lines may represent estimated used years outputted by inputting arbitrary X and Y values. In FIGS. 16B and 16C, X marks and square marks represent examples of estimating used years for memory devices for which information is unknown. For example, if measured performance values of a specific memory device corresponds to the X mark on the plane where Z=0, the estimated used year of the specific memory device may correspond to a Z value where the square mark connected to the X mark is located.

Figure 17A:
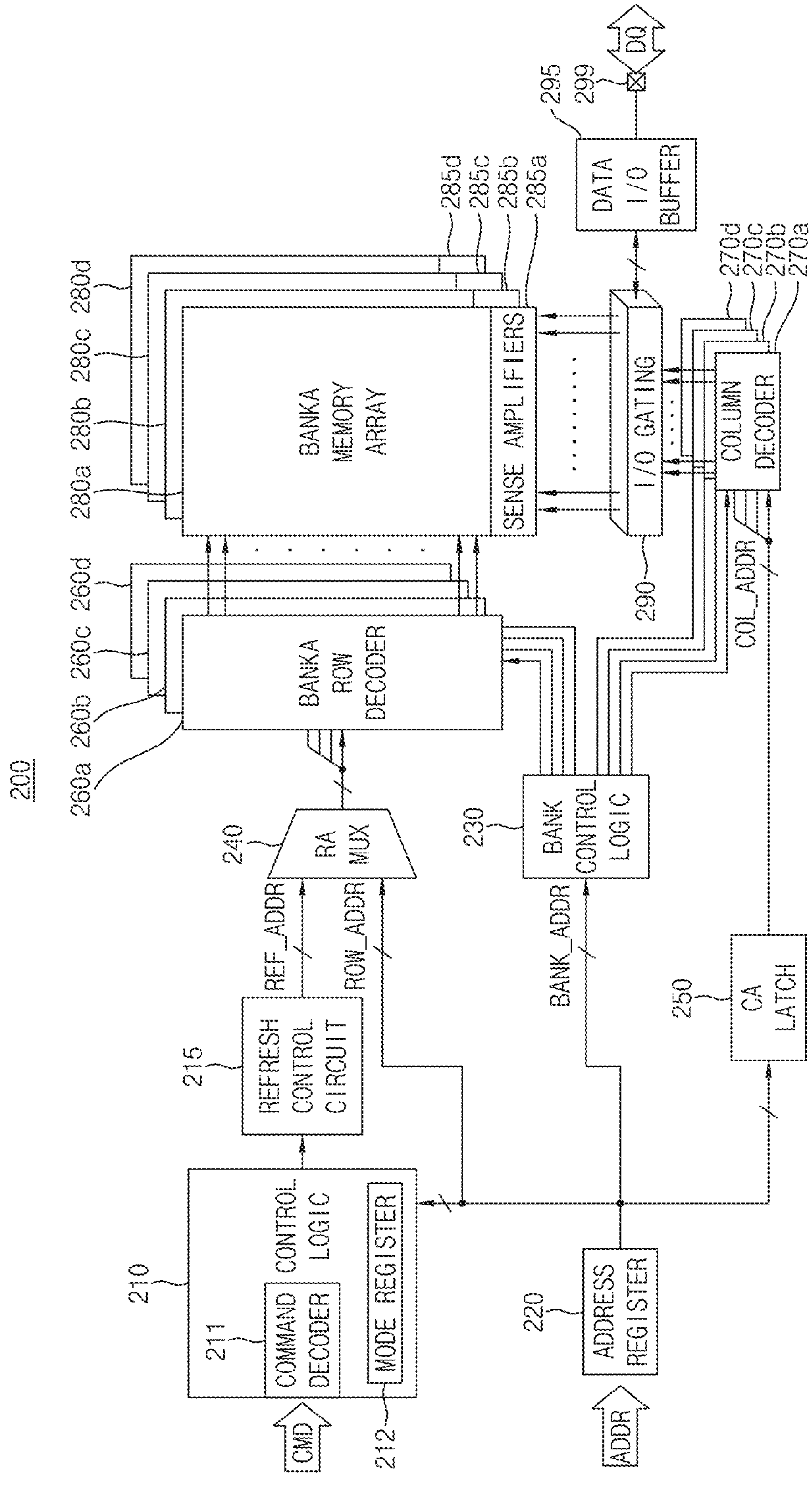
FIGS. 17A and 17B are block diagrams illustrating examples of a memory device.
Figure 17B:
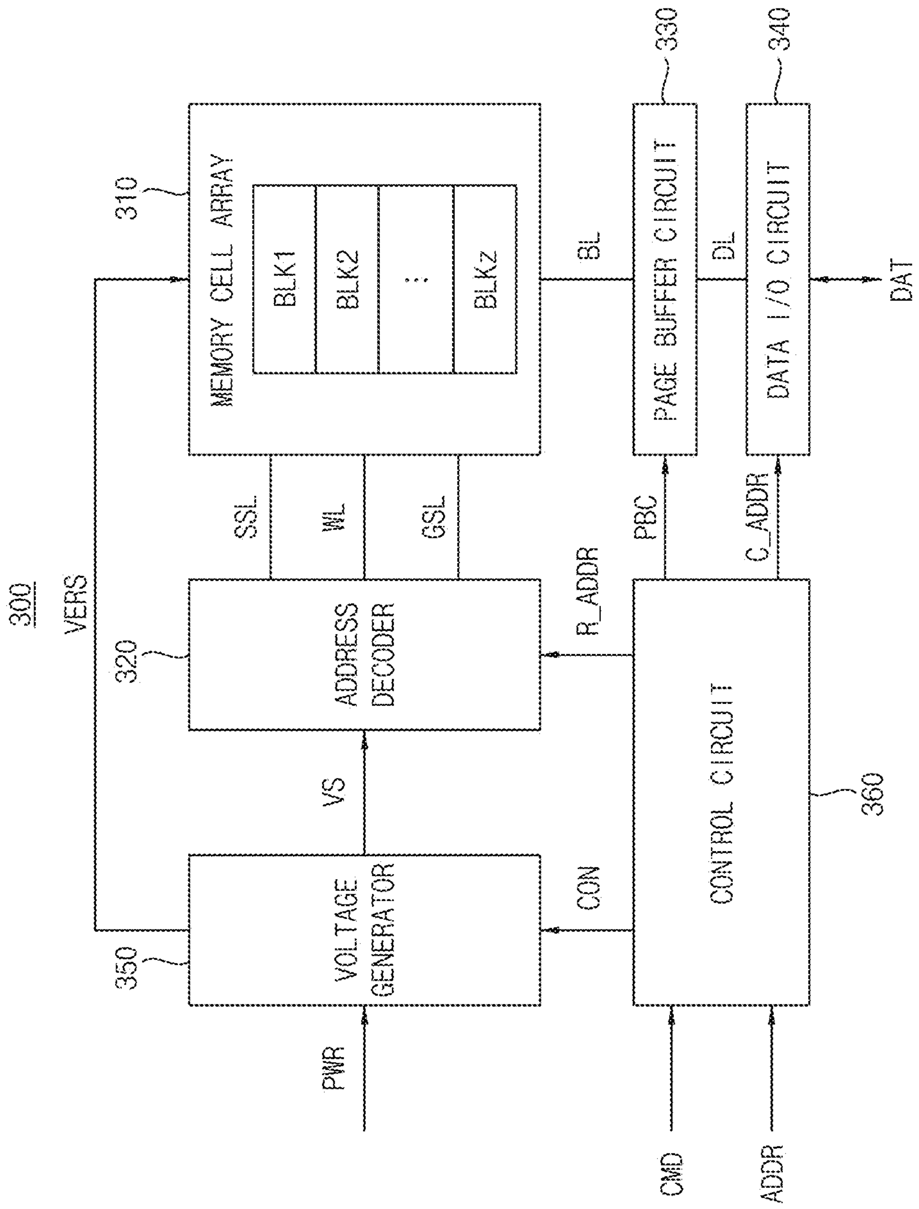

FIGS. 17A and 17B are block diagrams illustrating examples of a memory device.

Referring to FIG. 17A, a memory device 200 may include a control logic 210, a refresh control circuit 215, an address register 220, a bank control logic 230, a row address multiplexer 240, a column address latch 250, a row decoder, a column decoder, a memory cell array, a sense amplifier unit, an input/output (I/O) gating circuit 290, a data I/O buffer 295 and a data I/O pad 299. For example, the memory device 200 may be one of various volatile memory devices such as a DRAM device.

The memory cell array may include a plurality of memory cells. The memory cell array may include a plurality of bank arrays, e.g., first to fourth bank arrays 280*a*, 280*b*, 280*c* and 280*d*. The row decoder may include a plurality of bank row decoders, e.g., first to fourth bank row decoders 260*a*, 260*b*, 260*c* and 260*d* connected to the first to fourth bank arrays 280*a*, 280*b*, 280*c* and 280*d*, respectively. The column decoder may include a plurality of bank column decoders, e.g., first to fourth bank column decoders 270*a*, 270*b*, 270*c* and 270*d* connected to the first to fourth bank arrays 280*a*, 280*b*, 280*c* and 280*d*, respectively. The sense amplifier unit may include a plurality of bank sense amplifiers, e.g., first to fourth bank sense amplifiers 285*a*, 285*b*, 285*c* and 285*d* connected to the first to fourth bank arrays 280*a*, 280*b*, 280*c* and 280*d*, respectively.

The first to fourth bank arrays 280*a* to 280*d*, the first to fourth bank row decoders 260*a* to 260*d*, the first to fourth bank column decoders 270*a* to 270*d*, and the first to fourth bank sense amplifiers 285*a* to 285*d* may form first to fourth banks, respectively. For example, the first bank array 280*a*, the first bank row decoder 260*a*, the first bank column decoder 270*a*, and the first bank sense amplifier 285*a* may form the first bank; the second bank array 280*b*, the second bank row decoder 260*b*, the second bank column decoder 270*b*, and the second bank sense amplifier 285*b* may form the second bank; the third bank array 280*c*, the third bank row decoder 260*c*, the third bank column decoder 270*c*, and the third bank sense amplifier 285*c* may form the third bank; and the fourth bank array 280*d*, the fourth bank row decoder 260*d*, the fourth bank column decoder 270*d*, and the fourth bank sense amplifier 285*d* may form the fourth bank.

The address register 220 may receive an address ADDR including a bank address BANK_ADDR, a row address ROW_ADDR and a column address COL_ADDR from a controller located outside the memory device 200. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to receipt of the bank address BANK_ADDR. One of the first to fourth bank row decoders 260*a* to 260*d* corresponding to the received bank address BANK_ADDR may be activated in response to the bank control signals generated by the bank control logic 230, and one of the first to fourth bank column decoders 270*a* to 270*d* corresponding to the received bank address BANK_ADDR may be activated in response to the bank control signals generated by the bank control logic 230.

The refresh control circuit 215 may generate a refresh address REF_ADDR in response to receipt of a refresh command or entrance of any self-refresh mode. For example, the refresh control circuit 215 may include a refresh counter that is configured to sequentially change the refresh address REF_ADDR from a first address of the memory cell array to a last address of the memory cell array. The refresh control circuit 215 may receive control signals from the control logic 210.

The row address multiplexer 240 may receive the row address ROW_ADDR from the address register 220, and may receive the refresh address REF_ADDR from the refresh control circuit 215. The row address multiplexer 240 may selectively output the row address ROW_ADDR or the refresh address REF_ADDR. A row address (e.g., the row address ROW_ADDR or the refresh address REF_ADDR) output from the row address multiplexer 240 may be applied to the first to fourth bank row decoders 260*a* to 260*d*.

The activated one of the first to fourth bank row decoders 260*a* to 260*d* may decode the row address output from the row address multiplexer 240, and may activate a wordline corresponding to the row address. For example, the activated bank row decoder may apply a wordline driving voltage to the wordline corresponding to the row address.

The column address latch 250 may receive the column address COL_ADDR from the address register 220, and may temporarily store the received column address COL_ADDR. The column address latch 250 may apply the temporarily stored or received column address COL_ADDR to the first to fourth bank column decoders 270*a* to 270*d*.

The activated one of the first to fourth bank column decoders 270*a* to 270*d* may decode the column address COL_ADDR output from the column address latch 250, and may control the I/O gating circuit 290 to output data corresponding to the column address COL_ADDR.

The I/O gating circuit 290 may include a circuitry for gating I/O data. For example, although not shown, the I/O gating circuit 290 may include an input data mask logic, read data latches for storing data output from the first to fourth bank arrays 280*a* to 280*d*, and write drivers for writing data to the first to fourth bank arrays 280*a* to 280*d*.

Data DQ to be read from one of the first to fourth bank arrays 280*a* to 280*d* may be sensed by a sense amplifier coupled to the one bank array, and may be stored in the read data latches. The data DQ stored in the read data latches may be provided to the controller via the data I/O buffer 295 and the data I/O pad 299. Data DQ received via the data I/O pad 299 that are to be written to one of the first to fourth bank arrays 280*a* to 280*d* may be provided from the controller to the data I/O buffer 295. The data DQ received via the data I/O pad 299 and provided to the data I/O buffer 295 may be written to the one bank array via the write drivers in the I/O gating circuit 290.

The control logic 210 may control an operation of the memory device 200. For example, the control logic 210 may generate control signals for the memory device 200 to perform a data write operation or a data read operation. The control logic 210 may include a command decoder 211 that decodes a command CMD received from the controller and a mode register 212 that sets an operation mode of the memory device 200.

Referring to FIG. 17B, a memory device 300 may include a memory cell array 310, an address decoder 320, a page buffer circuit 330, a data input/output (I/O) circuit 340, a voltage generator 350 and a control circuit 360. For example, the memory device 300 may be one of various nonvolatile memory devices such as a NAND flash memory device.

The memory cell array 310 may be connected to the address decoder 320 via a plurality of string selection lines SSL, a plurality of wordlines WL and a plurality of ground selection lines GSL. The memory cell array 310 may be further connected to the page buffer circuit 330 via a plurality of bitlines BL. The memory cell array 310 may include a plurality of memory cells (e.g., a plurality of nonvolatile memory cells) that are connected to the plurality of wordlines WL and the plurality of bitlines BL. The memory cell array 310 may be divided into a plurality of memory blocks BLK1, BLK2, . . . , BLKz each of which includes memory cells.

In some implementations, the plurality of memory cells may be arranged in a two-dimensional (2D) array structure or a three-dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 360 may receive a command CMD and an address ADDR from a controller located outside the memory device 300, and may control erasure, programming and read operations of the memory device 300 based on the command CMD and the address ADDR. An erasure operation may include performing a sequence of erase loops, and a programming operation may include performing a sequence of program loops. Each program loop may include a program operation and a program verification operation. Each erase loop may include an erase operation and an erase verification operation. The read operation may include a normal read operation and data recovery read operation.

For example, the control circuit 360 may generate control signals CON, which are used for controlling the voltage generator 350, and may generate control signal PBC for controlling the page buffer circuit 330, based on the command CMD, and may generate a row address R_ADDR and a column address C_ADDR based on the address ADDR. The control circuit 360 may provide the row address R_ADDR to the address decoder 320 and may provide the column address C_ADDR to the data I/O circuit 340.

The address decoder 320 may be connected to the memory cell array 310 via the plurality of string selection lines SSL, the plurality of wordlines WL and the plurality of ground selection lines GSL. For example, in the data erase/write/read operations, the address decoder 320 may determine at least one of the plurality of wordlines WL as a selected wordline, at least one of the plurality of string selection lines SSL as a selected string selection line, and at least one of the plurality of ground selection lines GSL as a selected ground selection line, based on the row address R_ADDR.

The voltage generator 350 may generate voltages VS that are required for an operation of the memory device 300 based on a power PWR and the control signals CON. The voltages VS may be applied to the plurality of string selection lines SSL, the plurality of wordlines WL and the plurality of ground selection lines GSL via the address decoder 320. In addition, the voltage generator 350 may generate an erase voltage VERS that is required for the erase operation based on the power PWR and the control signals CON.

The page buffer circuit 330 may be connected to the memory cell array 310 via the plurality of bitlines BL. The page buffer circuit 330 may include a plurality of page buffers. The page buffer circuit 330 may store data DAT to be programmed into the memory cell array 310 or may read data DAT sensed from the memory cell array 310. In other words, the page buffer circuit 330 may operate as a write driver or a sensing amplifier according to an operation mode of the memory device 300.

The data I/O circuit 340 may be connected to the page buffer circuit 330 via data lines DL. The data I/O circuit 340 may provide the data DAT from the outside of the memory device 300 to the memory cell array 310 via the page buffer circuit 330 or may provide the data DAT from the memory cell array 310 to the outside of the memory device 300, based on the column address C_ADDR.

Although the memory device is described based on a DRAM device and a NAND flash memory device, the memory device may be any volatile memory device, and/or any nonvolatile memory device, e.g., a static random access memory (SRAM) device, a phase-change random access memory (PRAM) device, a resistive random access memory (RRAM) device, a magnetic random access memory (MRAM) device, a ferroelectric random access memory (FRAM) device, etc.

Figure 18A:
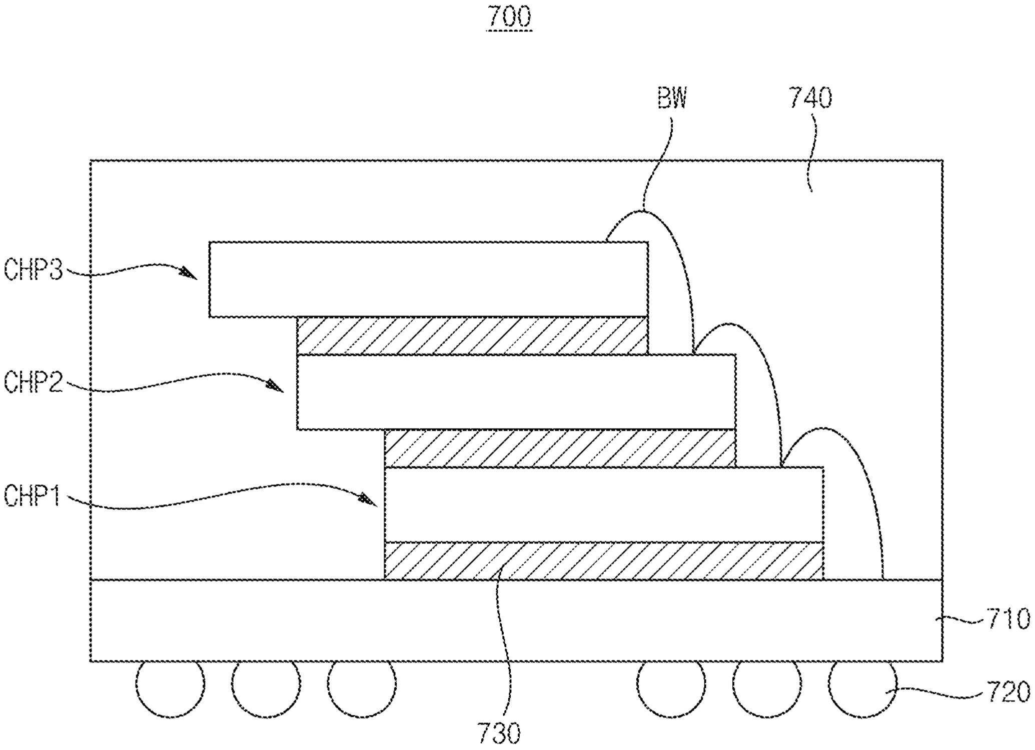
FIGS. 18A, 18B, and 18C are diagrams illustrating implementation examples of memory devices.
Figure 18B:
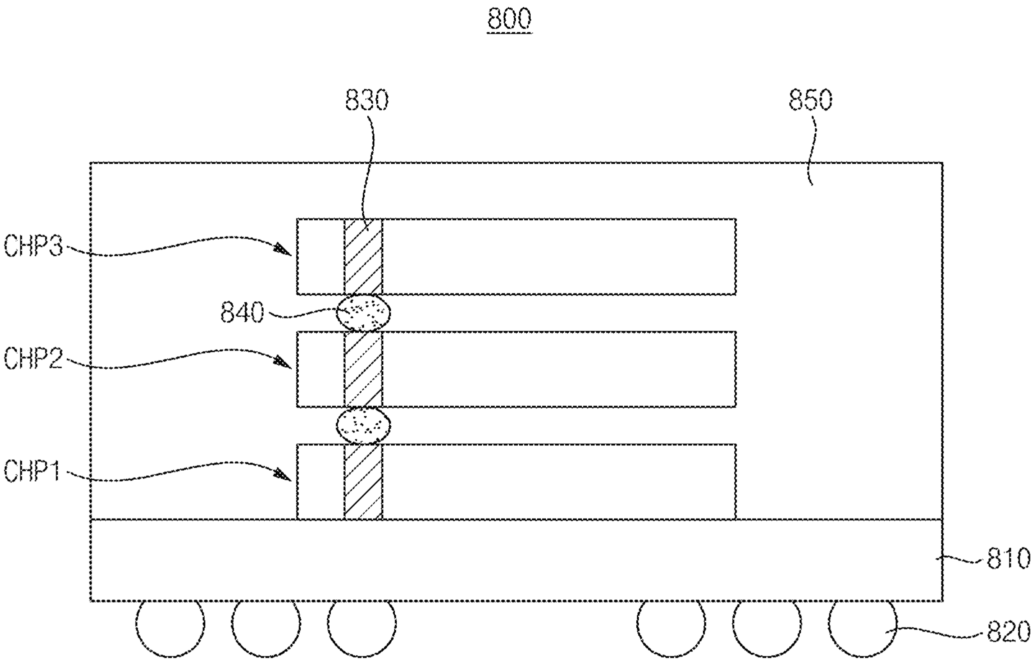
Figure 18C:
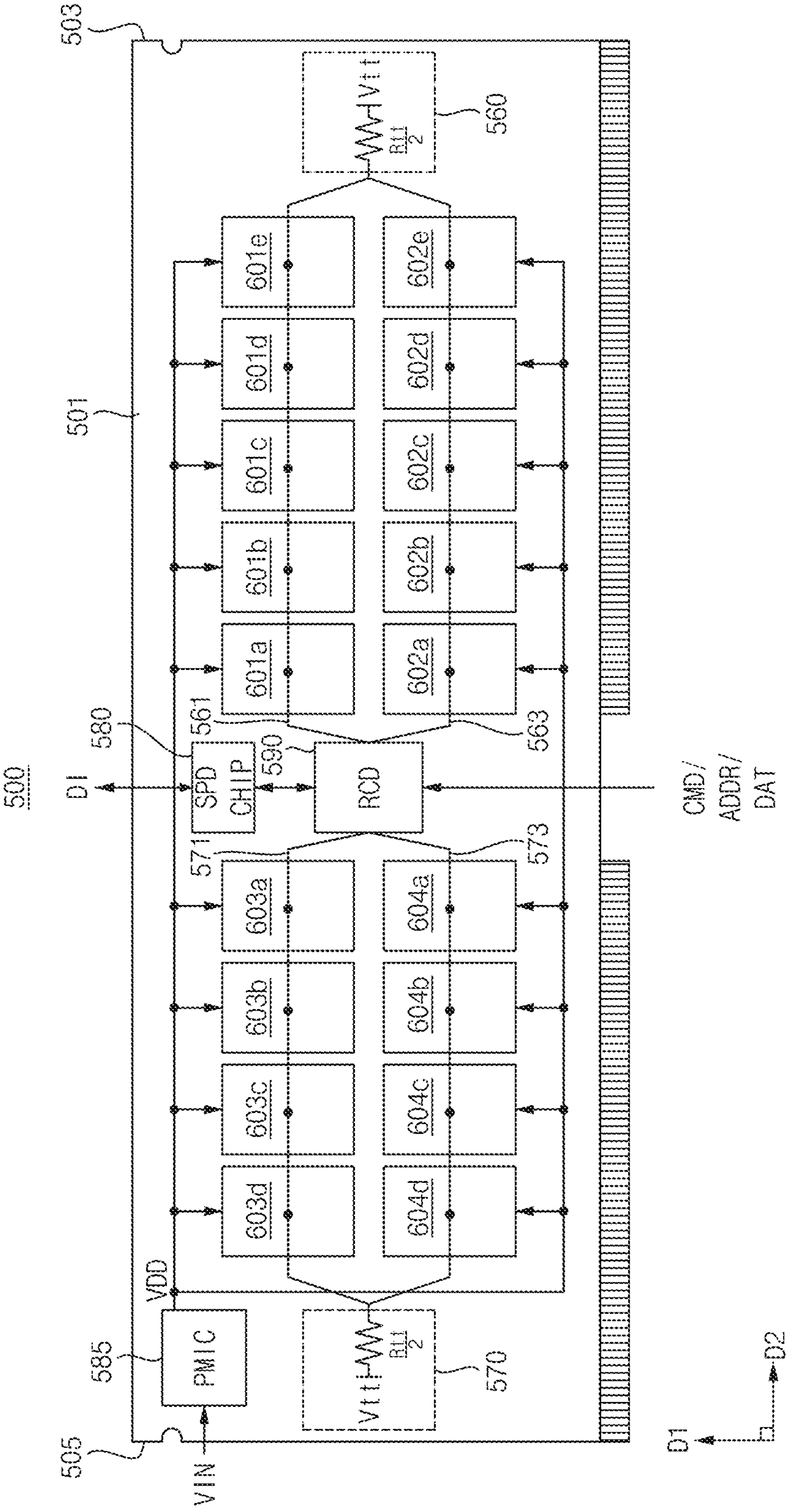

FIGS. 18A, 18B, and 18C are diagrams illustrating implementation examples of memory devices.

Referring to FIGS. 18A and 18B, examples where memory devices are provided in the form of a memory package including memory chips are illustrated.

For example, as illustrated in FIG. 18A, a memory package 700 may include a base substrate 710, and a plurality of memory chips CHP1, CHP2 and CHP3 stacked on the base substrate 710. Each of the memory chips CHP1 to CHP3 may include at least one memory device.

In some implementations, the memory chips CHP1 to CHP3 may be stacked on the base substrate 710 such that a surface on which I/O pads are formed faces upwards. In some implementations, with respect to each of the memory chips CHP1 to CHP3, the I/O pads may be arranged near one side of the semiconductor substrate. As such, the memory chips CHP1 to CHP3 may be stacked scalariformly, that is, in a step shape, such that the I/O pads of each memory chip may be exposed. In such stacked state, the memory chips CHP1 to CHP3 may be electrically connected to the base substrate 710 through a plurality of bonding wires BW.

The stacked memory chips CHP1 to CHP3 and the plurality of bonding wires BW may be fixed by a sealing member 740, and adhesive members 730 may intervene between the base substrate 710 and the memory chips CHP1 to CHP3. Conductive bumps 720 may be formed on a bottom surface of the base substrate 710 for electrical connections to an external device.

For example, as illustrated in FIG. 18B, a memory package 800 may include a base substrate 810, and a plurality of memory chips CHP1, CHP2 and CHP3 stacked on the base substrate 810. The descriptions repeated with or overlapping with descriptions of FIG. 18A will be omitted in the interest of brevity.

Each of the memory chips CHP1 to CHP3 may further include a plurality of through silicon vias (TSVs) 830. Conductive bumps 820 and a sealing member 850 may be substantially the same as the conductive bumps 720 and the sealing member 740 in FIG. 18A, respectively.

In some implementations, with respect to each of the memory chips CHP1 to CHP3, the plurality of TSVs 830 may be arranged at the same locations in each memory chip. As such, the memory chips CHP1 to CHP3 may be stacked such that the plurality of TSVs 830 of each memory chip may be completely overlapped (e.g., arrangements of the plurality of TSVs 830 may be perfectly matched in the memory chips CHP1 to CHP3). In such stacked state, the memory chips CHP1 to CHP3 may be electrically connected to one another and the base substrate 810 through the plurality of TSVs 830 and conductive material 840.

Referring to FIG. 18C, an example where memory devices are provided in the form of a memory module including memory packages.

For example, a memory module 500 may include a circuit board 501, a buffer chip 590 (e.g., a registered clock driver; RCD), a plurality of memory devices 601*a*, 601*b*, 601*c*, 601*d*, 601*e*, 602*a*, 602*a*, 602*c*, 602*d*, 602*e*, 603*a*, 603*b*, 603*c*, 603*d*, 604*a*, 604*b*, 604*c* and 604*d*, module resistance units 560 and 570, a serial present detection (SPD) chip 580, and/or a power management integrated circuit (PMIC) 585. For example, the plurality of memory devices 601*a* to 601*e*, 602*a* to 602*e*, 603*a* to 603*d* and 604*a* to 604*d*, the module resistance units 560 and 570, the SPD chip 580, the PMIC 585 and/or the buffer chip 590 may be disposed, arranged or mounted on or in the circuit board 501.

The buffer chip 590 may control the plurality of memory devices 601*a* to 601*e*, 602*a* to 602*e*, 603*a* to 603*d* and 604*a* to 604*d*, and the PMIC 585, under a control of a memory controller that is located outside the memory module 500. For example, the buffer chip 590 may receive an address ADDR, a command CMD and data DAT from the memory controller.

The SPD chip 580 may be a programmable read only memory (PROM) (e.g., an electrically erasable PROM (EEPROM)). The SPD chip 580 may include initial information and/or device information DI of the memory module 500. In some implementations, the SPD chip 580 may include the initial information and/or the device information DI such as a module form, a module configuration, a storage capacity, a module type, an execution environment, and/or the like of the memory module 500. When a memory system including the memory module 500 is booted up, the memory controller may read the device information DI from the SPD chip 580, and may recognize the memory module 500 based on the device information DI. The memory controller may control the memory module 500 based on the device information DI from the SPD chip 580. For example, the memory controller may recognize a type of the memory devices included in the memory module 500 based on the device information DI from the SPD chip 580.

The circuit board 501 may extend in a second direction D2, perpendicular to a first direction D1, between a first edge portion 503 and a second edge portion 505. The first edge portion 503 and the second edge portion 505 may extend in the first direction D1. For example, the circuit board 501 may be a printed circuit board (PCB). The buffer chip 590 may be arranged on a center of the circuit board 501. The memory devices 601*a* to 601*e* and 602*a* to 602*e* may be arranged in or along a plurality of rows between the buffer chip 590 and the first edge portion 503, and the memory devices 603*a* to 603*d* and 604*a* to 604*d* may be arranged in or along a plurality of rows between the buffer chip 590 and the second edge portion 505.

The buffer chip 590 may store the data DAT in the plurality of memory devices 601*a* to 601*e*, 602*a* to 602*e*, 603*a* to 603*d* and 604*a* to 604*d*. The buffer chip 590 may provide a command/address (CA) signal (e.g., corresponding to the command CMD and the address ADDR) to the plurality of memory devices 601*a* to 601*e*, 602*a* to 602*e*, 603*a* to 603*d* and 604*a* to 604*d* through CA transmission lines 561, 563, 571 and 573. In some implementations, operations described herein as being performed by the buffer chip 590 may be performed by processing circuitry.

The CA transmission lines 561 and 563 may be connected in common to the module resistance unit 560 that is adjacent to the first edge portion 503, and the CA transmission lines 571 and 573 may be connected in common to the module resistance unit 570 that is adjacent to the second edge portion 505. Each of the module resistance units 560 and 570 may include a termination resistor Rtt/2 connected to a termination voltage Vtt.

For example, each of or at least one of the plurality of memory devices 601*a* to 601*e*, 602*a* to 602*e*, 603*a* to 603*d* and 604*a* to 604*d* may be or include a DRAM device.

The PMIC 585 may be disposed to be adjacent to the buffer chip 590. The PMIC 585 may generate a power supply voltage VDD based on an input voltage VIN, and may provide the power supply voltage VDD to the plurality of memory devices 601*a* to 601*e*, 602*a* to 602*e*, 603*a* to 603*d* and 604*a* to 604*d*.

Figure 19:
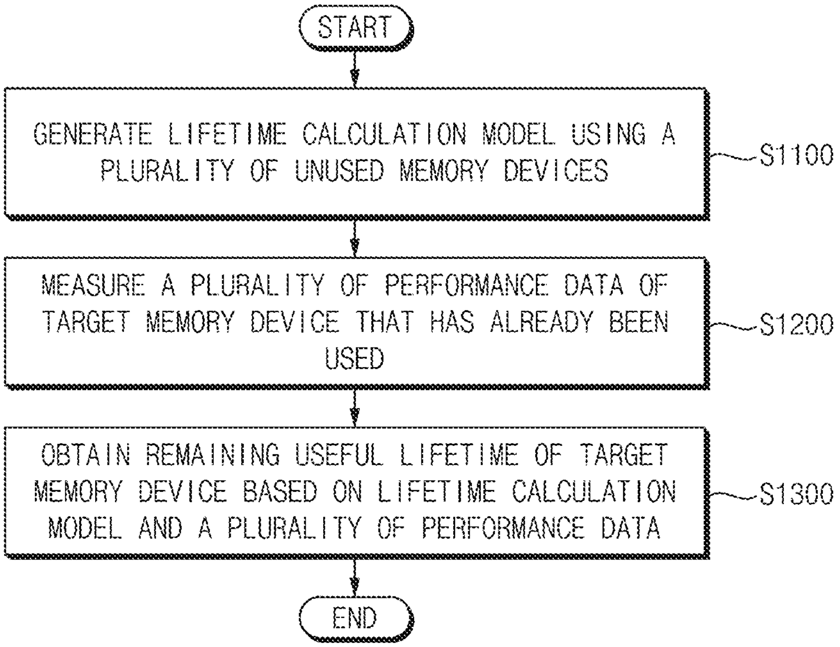
FIG. 19 is a flowchart illustrating an example of a method of calculating remaining useful lifetime of a memory device.

FIG. 19 is a flowchart illustrating an example of a method of calculating remaining useful lifetime of a memory device.

Referring to FIG. 19, a method of calculating remaining useful lifetime may be performed using a lifetime calculation model. For example, the method of calculating the remaining useful lifetime may be performed on a computer-based system and/or tool, at least part of which is implemented in hardware and/or software.

In the method of calculating the remaining useful lifetime, a lifetime calculation model is generated using a plurality of unused memory devices (operation S1100). Operation S1100 may be performed based on the modeling method described with reference to FIGS. 1 through 16C. For example, in operation S1100, a plurality of performance measurement data associated with a plurality of performances of the plurality of unused memory devices may be obtained while an accelerated aging test is performing on the plurality of unused memory devices, a plurality of statistical data may be calculated by performing a statistical distribution approximation on the plurality of performance measurement data, a plurality of first conditional probabilities may be calculated based on a plurality of sample performance data associated with the plurality of performances and the plurality of statistical data, and the lifetime calculation model may be trained based on the plurality of first conditional probabilities. The lifetime calculation model may output first estimated used lifetime data and first uncertainty data, the first estimated used lifetime data may correspond to the plurality of sample performance data, and the first uncertainty data may represent uncertainty of the first estimated used lifetime data.

A plurality of performance data associated with the plurality of performances of at least one target memory device that has already been used are measured (operation S1200). As described above, the at least one target memory device may be the same product as the plurality of unused memory devices, and may be a product that has already been used by a user in the field and has been recovered after exposing certain environment and/or damage. The plurality of performance data may be implemented similarly to the plurality of performance measurement data PMDAT1 to PMDATK and the plurality of sample performance data SPDAT. For example, operation S1200 may be performed by the performance measuring equipment 1500 and data collection module 1310 in FIG. 2.

Remaining useful lifetime of the at least one target memory device is obtained based on the lifetime calculation model and the plurality of performance data associated with the plurality of performances (operation S1300). For example, operation S1300 may be performed by the inferring and calculating module 1330 in FIG. 2. Operation S1300 will be described with reference to FIGS. 20 and 21.

Figure 20:
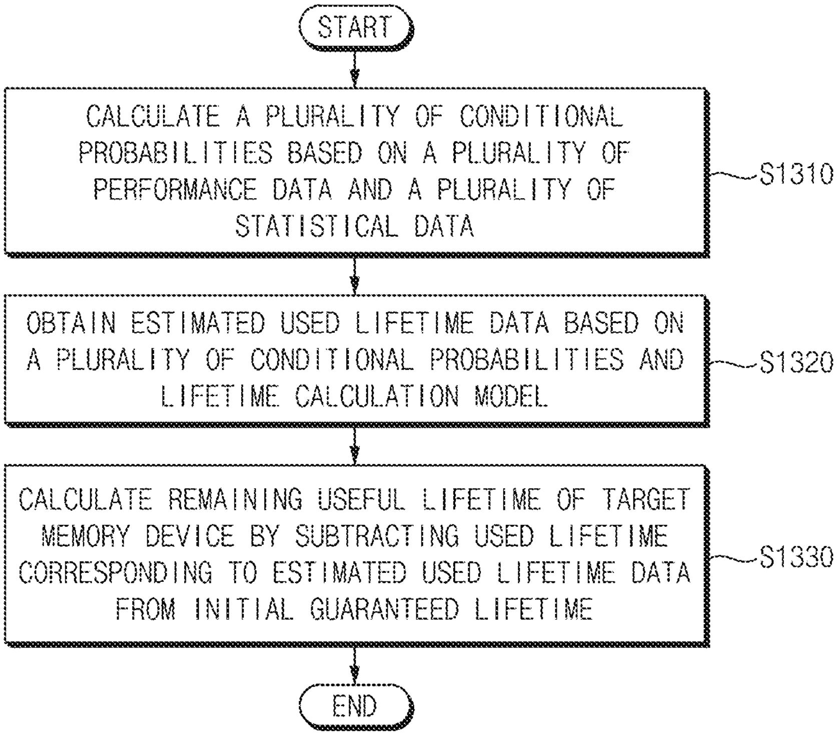
FIGS. 20 and 21 are flowcharts illustrating examples of obtaining remaining useful lifetime in FIG. 19.
Figure 21:
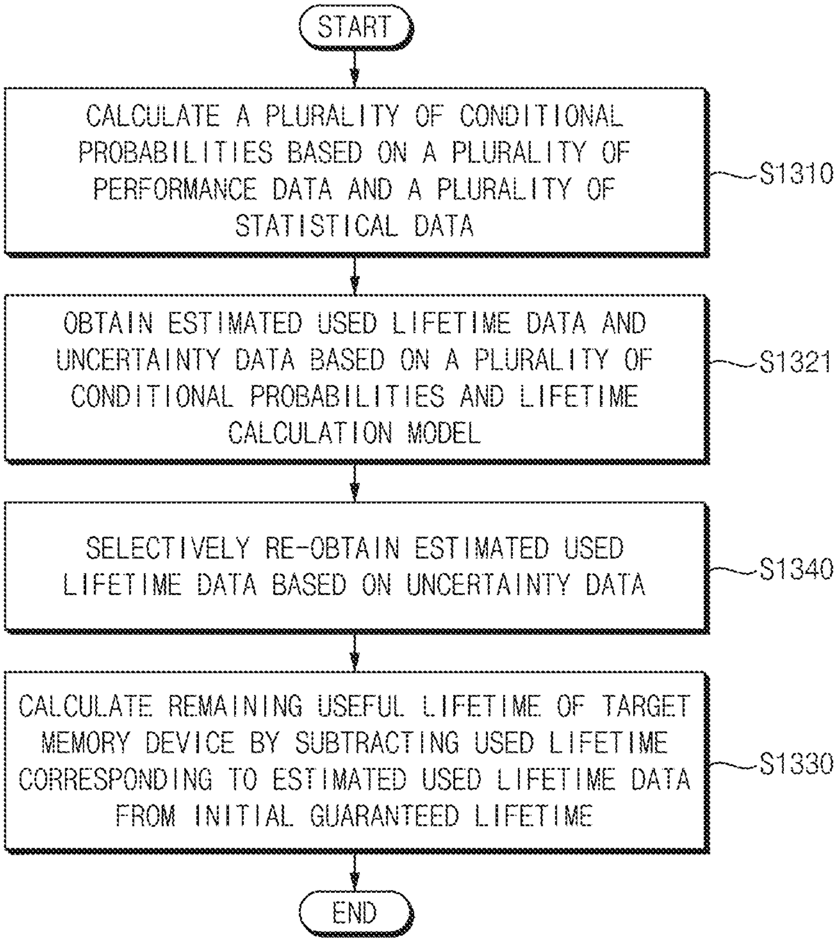

FIGS. 20 and 21 are flowcharts illustrating examples of obtaining remaining useful lifetime in FIG. 19.

Referring to FIGS. 19 and 20, in operation S1300, a plurality of second conditional probabilities may be calculated based on the plurality of performance data and the plurality of statistical data (operation S1310), and second estimated used lifetime data may be obtained based on the plurality of second conditional probabilities and the lifetime calculation model (operation S1320). The second estimated used lifetime data may correspond to the plurality of performance data. Operations S1310 and S1320 may be similar to operations S300 and S400 in FIG. 1, respectively. To distinguish between operations S300 and S400 and operations S1310 and S1320, the data that are obtained in operations S300 and S400 of operation S1100 may be referred to as the plurality of first conditional probabilities and the first estimated used lifetime data, and the data that are obtained in operations S1310 and S1320 may be referred to as the plurality of second conditional probabilities and the second estimated used lifetime data.

The remaining useful lifetime of the at least one target memory device may be calculated by subtracting used lifetime of the at least one target memory device from initial guaranteed lifetime of the at least one target memory device (operation S1330). The used lifetime may correspond to the second estimated used lifetime data. For example, the initial guaranteed lifetime may represent a warranty period determined at the design phase of the target memory device and specified in the product specifications. For example, when the initial guaranteed lifetime is twenty years and the used lifetime is estimated to be eight years, the remaining useful lifetime may be obtained as twelve years.

Referring to FIGS. 19 and 21, in operation S1300, operations S1310 and S1330 may be substantially the same as those described with reference to FIG. 20.

The second estimated used lifetime data and second uncertainty data may be obtained based on the plurality of second conditional probabilities and the lifetime calculation model (operation S1321). The second estimated used lifetime data may correspond to the plurality of performance data, and the second uncertainty data may represent uncertainty of the second estimated used lifetime data. Operation S1321 may be substantially the same as operation S1320 in FIG. 20, except that the second uncertainty data is further obtained in operation S1321. To distinguish between operation S400 and operation S1321, the data that is obtained in operation S400 of operation S1100 may be referred to as the first uncertainty data, and the data that is obtained in operation S1321 may be referred to as the second uncertainty data.

The second estimated used lifetime data may be selectively re-obtained based on the second uncertainty data (operation S1340). For example, as with that described with reference to FIGS. 14 and 15, when an uncertainty value included in the second uncertainty data is greater than a reference value, the second estimated used lifetime data may be re-obtained by performing operations S1310 and S1321 again (e.g., by re-performing only the calculation), or the second estimated used lifetime data may be re-obtained by performing operations S1200, S1310 and S1321 again (e.g., by re-performing the performance measurement and calculation). For example, when the uncertainty value included in the second uncertainty data is less than or equal to the reference value, the second estimated used lifetime data may not be obtained again.

FIGS. 22, 23, 24, and 25 are flowcharts illustrating an example of a method of calculating remaining useful lifetime of a memory device. The descriptions repeated with or overlapping with descriptions of FIG. 19 will be omitted in the interest of brevity.

Figure 22:
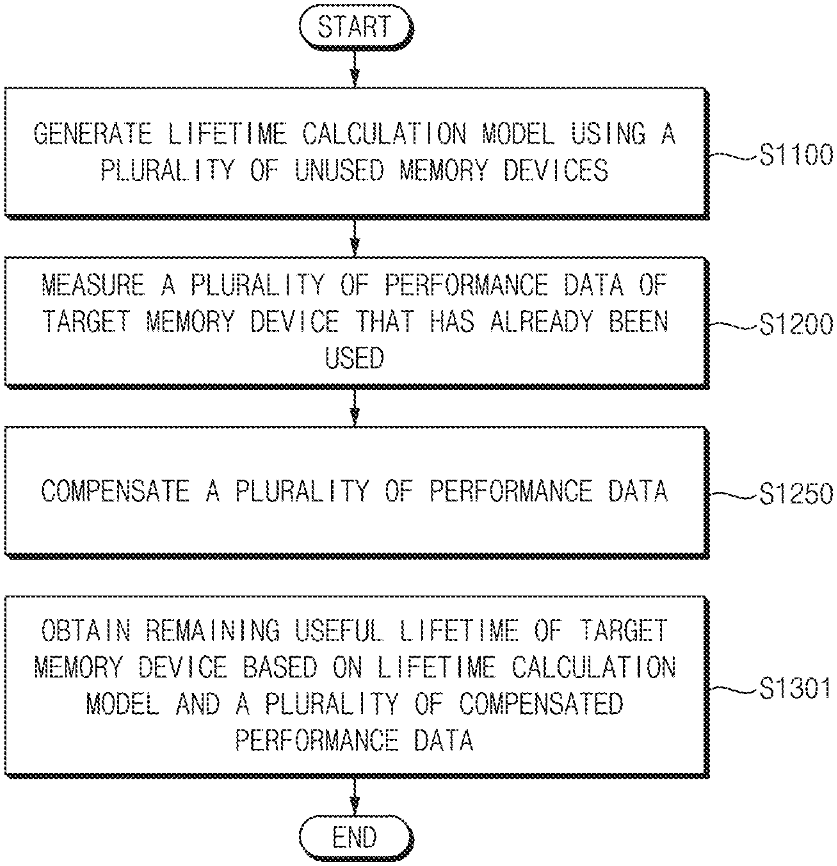
FIGS. 22, 23, 24, and 25 are flowcharts illustrating an example of a method of calculating remaining useful lifetime of a memory device.

Referring to FIG. 22, in a method of calculating remaining useful lifetime, operations S1100 and S1200 may be substantially the same as those described with reference to FIG. 19.

In some implementations, even if the plurality of unused memory devices and the at least one target memory device are the same product and have the same structure, the specific provision scheme may be different from each other. For example, the plurality of unused memory devices may be provided in the form of the memory packages as described with reference to FIGS. 18A and 18B, and the lifetime calculation model may be generated based on the memory packages. For example, the at least one target memory device may be provided in the form of the memory module as described with reference to FIG. 18C.

Therefore, the plurality of performance data that are measured in operation S1200 may be compensated or corrected (operation S1250). For example, the plurality of performance data may be compensated by simply adding or subtracting an offset value to or from the plurality of performance data. For example, the plurality of performance data may be compensated by reflecting RLC loading characteristics of the substrate (e.g., the circuit board 501 in FIG. 18C) included in the memory module.

Thereafter, the remaining useful lifetime of the at least one target memory device may be obtained based on the lifetime calculation model and the plurality of compensated performance data (operation S1301). Operation S1301 may be substantially identical to operation S1300 in FIG. 19, except that the plurality of compensated performance data are used in operation S1301.

Figure 23:
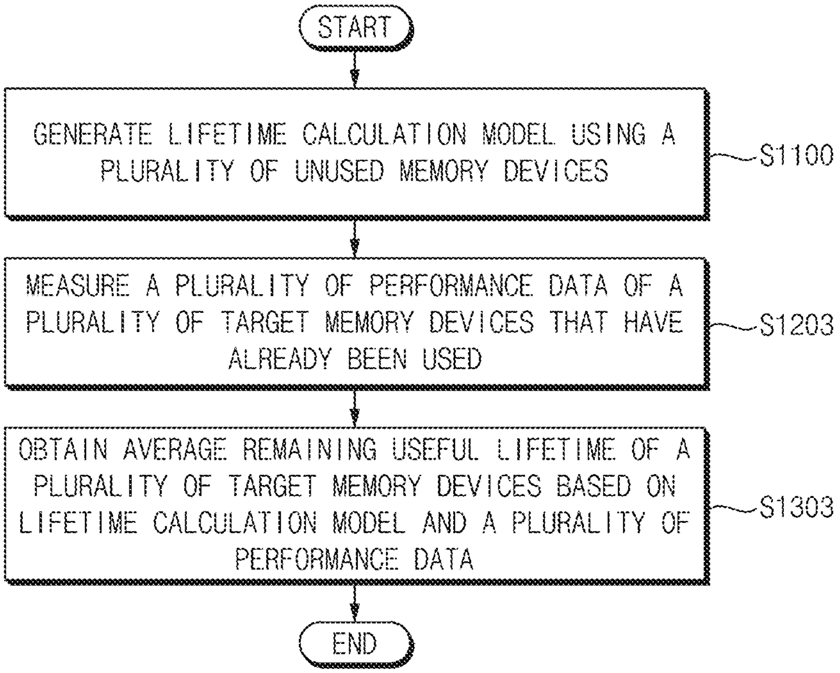

Referring to FIG. 23, in a method of calculating remaining useful lifetime, operation S1100 may be substantially the same as that described with reference to FIG. 19.

A plurality of performance data associated with the plurality of performances of a plurality of target memory devices that have already been used are measured (operation S1203), and average remaining useful lifetime of the plurality of target memory devices is obtained based on the lifetime calculation model and the plurality of performance data measured from the plurality of target memory devices (operation S1303). For example, single remaining useful lifetime may be obtained for a memory device group including the plurality of target memory devices. For example, the plurality of performance data may be averaged, and the average remaining useful lifetime may be obtained based on the averaged performance data. For example, a plurality of remaining useful lifetimes may be obtained from the plurality of performance data, and the average remaining useful lifetime may be obtained by averaging the plurality of remaining useful lifetimes.

Figure 24:
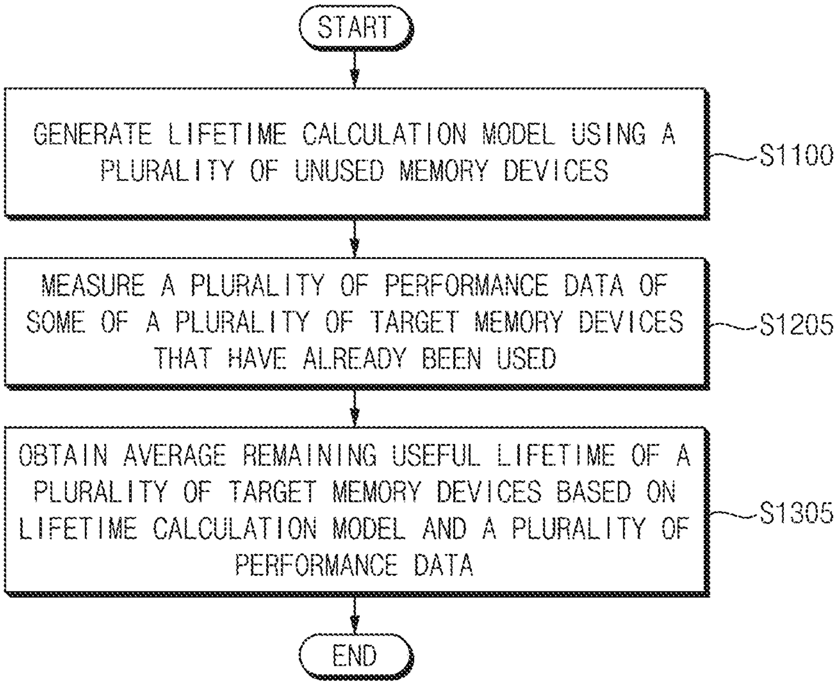
Figure 25:
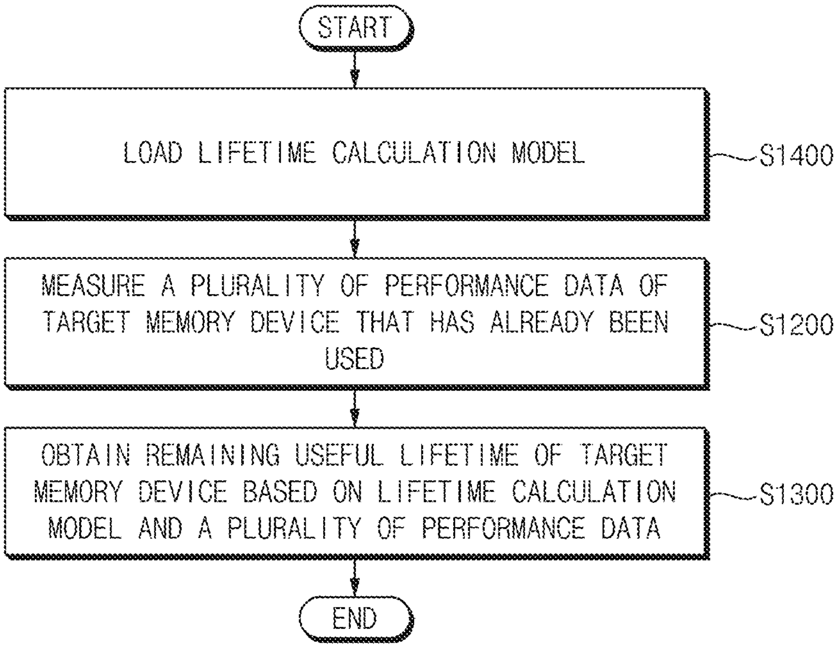

Referring to FIG. 24, in a method of calculating remaining useful lifetime, operation S1100 may be substantially the same as that described with reference to FIG. 19.

A plurality of performance data associated with the plurality of performances of some of the plurality of target memory devices that have already been used are measured (operation S1205), and average remaining useful lifetime of the plurality of target memory devices is obtained based on the lifetime calculation model and the plurality of performance data measured from some of the plurality of target memory devices (operation S1305). Operations S1205 and S1305 may be substantially the same as operations S1203 and S1303 in FIG. 23, respectively, except that operations S1205 and S1305 are performed on selected samples among the plurality of target memory devices.

Referring to FIG. 24, in a method of calculating remaining useful lifetime, the lifetime calculation model that is already generated by operation S1100 may be loaded (operation S1400), and operations S1200 and S1300 may be performed based on the loaded lifetime calculation model. In other words, operation S1100 in FIG. 19 may be replaced with operation S1400, and the lifetime calculation model that is already generated may be used as in operation S1400, rather than generating the lifetime calculation model every time. In some implementations, operation S1100 may be replaced with operation S1400 in the examples of FIGS. 22, 23 and 24.

The example implementations may be applied to various electronic devices and systems that include the memory devices. For example, the example implementations may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The foregoing is illustrative of example implementations and is not to be construed as limiting thereof. Although some example implementations have been described, those skilled in the art will readily appreciate that many modifications are possible in the example implementations without materially departing from the novel teachings and advantages of the example implementations. Accordingly, all such modifications are intended to be included within the scope of the example implementations as defined in the claims. Therefore, it is to be understood that the foregoing is illustrative of various example implementations and is not to be construed as limited to the specific example implementations disclosed, and that modifications to the disclosed example implementations, as well as other example implementations, are intended to be included within the scope of the appended claims.

What is claimed is:

1. A modeling method for estimating used lifetime of a used memory device, the modeling method being performed by executing program code using at least one processor, the program code being stored in a non-transitory computer readable medium, the modeling method comprising:

receiving a plurality of performance measurement data, the plurality of performance measurement data being associated with a plurality of performances of a plurality of unused memory devices and based on an accelerated aging test performing on the plurality of unused memory devices; and inputting the plurality of performance measurement data into a lifetime calculation model to obtain a trained lifetime calculation model based on a plurality of conditional probabilities, the plurality of conditional probabilities being based on a plurality of sample performance data and a plurality of statistical data, the plurality of sample performance data being associated with the plurality of performances, the plurality of statistical data being based on a statistical distribution approximation on the plurality of performance measurement data, the trained lifetime calculation model being configured to output, based on inputting a plurality of performance data of the used memory device, estimated used lifetime data and uncertainty data of the used memory device, the estimated used lifetime data corresponding to the plurality of sample performance data, the uncertainty data representing uncertainty of the estimated used lifetime data.

2. The modeling method of claim 1, comprising:

at a first time point before the accelerated aging test starts, obtaining first performance measurement data associated with the plurality of performances of the plurality of unused memory devices;

at a second time point after the first time point while the accelerated aging test is performing, obtaining second performance measurement data associated with the plurality of performances of the plurality of unused memory devices; and at a Kth time point after the second time point while the accelerated aging test is performing, obtaining Kth performance measurement data associated with the plurality of performances of the plurality of unused memory devices, wherein K is a positive integer greater than or equal to 3.

3. The modeling method of claim 2, comprising:

obtaining a plurality of estimated usage times of the plurality of unused memory devices, each of the plurality of estimated usage times corresponding to a respective time point between the first time point and the Kth time point.

4. The modeling method of claim 3, wherein obtaining the plurality of estimated usage times includes:

obtaining first estimated usage time of the plurality of unused memory devices based on the first time point;

obtaining second estimated usage time of the plurality of unused memory devices based on the second time point; and obtaining Kth estimated usage time of the plurality of unused memory devices based on the Kth time point.

5. The modeling method of claim 2, wherein the plurality of performances of the plurality of unused memory devices include first performance to Lth performance that are different from each other, wherein L is a positive integer greater than or equal to 2, wherein the first performance measurement data include first-first performance measurement data associated with the first performance to first-Lth performance measurement data associated with the Lth performance, wherein the second performance measurement data include second-first performance measurement data associated with the first performance to second-Lth performance measurement data associated with the Lth performance, and wherein the Kth performance measurement data include Kth-first performance measurement data associated with the first performance to Kth-Lth performance measurement data associated with the Lth performance.

6. The modeling method of claim 5, wherein each of the first performance to the Lth performance is performance for an input/output (I/O) timing of the plurality of unused memory devices.

7. The modeling method of claim 2, comprising:

obtaining first statistical data, the first statistical data including a first plurality of means and a first plurality of standard deviations that are calculated from the first performance measurement data;

obtaining second statistical data, the second statistical data including a second plurality of means and a second plurality of standard deviations that are calculated from the second performance measurement data; and obtaining Kth statistical data, the Kth statistical data including a Kth plurality of means and a Kth plurality of standard deviations that are calculated from the Kth performance measurement data.

8. The modeling method of claim 7, comprising:

obtaining first conditional probability, wherein in the first conditional probability, first estimated usage time corresponding to the first performance measurement data and the first statistical data is output based on the plurality of sample performance data being input;

obtaining second conditional probability, wherein in the second conditional probability, second estimated usage time corresponding to the second performance measurement data and the second statistical data is output based on the plurality of sample performance data being input; and obtaining Kth conditional probability, wherein in the Kth conditional probability, Kth estimated usage time corresponding to the Kth performance measurement data and the Kth statistical data is output based on the plurality of sample performance data being input.

9. The modeling method of claim 1, comprising:

re-training the lifetime calculation model based on the uncertainty data.

10. The modeling method of claim 9, wherein re-training the lifetime calculation model includes:

comparing a data uncertainty value included in the uncertainty data with a data reference value;

based on the data uncertainty value being greater than the data reference value, providing a plurality of additional sample performance data different from the plurality of sample performance data; and training the lifetime calculation model based on the plurality of additional sample performance data.

11. The modeling method of claim 9, wherein re-training the lifetime calculation model includes:

comparing a model uncertainty value included in the uncertainty data with a model reference value;

based on the model uncertainty value being greater than the model reference value, correcting the lifetime calculation model; and training the corrected lifetime calculation model based on the plurality of sample performance data.

12. The modeling method of claim 1, wherein each of the plurality of unused memory devices is a dynamic random access memory (DRAM) device or a flash memory device.

13. A method of calculating remaining useful lifetime of a memory device, the method being performed by executing program code using at least one processor, the program code being stored in a non-transitory computer readable medium, the method comprising:

inputting a plurality of performance measurement data into a lifetime calculation model to obtain a trained lifetime calculation model, the plurality of performance measurement data being associated with a plurality of performances of a plurality of unused memory devices;

performing a test on at least one target memory device to measure a plurality of performance data associated with a plurality of performances of the at least one target memory device, each target memory device being a used memory device; and inputting the plurality of performance data associated with the plurality of performances into the trained lifetime calculation model to obtain remaining useful lifetime of the at least one target memory device, wherein the plurality of performance measurement data are based on an accelerated aging test on the plurality of unused memory devices, and wherein the lifetime calculation model is trained based on a plurality of first conditional probabilities, the plurality of first conditional probabilities are based on a plurality of sample performance data and a plurality of statistical data, the plurality of sample performance data are associated with the plurality of performances, the plurality of statistical data are based on a statistical distribution approximation on the plurality of performance measurement data, the trained lifetime calculation model outputs first estimated used lifetime data and first uncertainty data, the first estimated used lifetime data corresponds to the plurality of sample performance data, and the first uncertainty data represents uncertainty of the first estimated used lifetime data.

14. The method of claim 13, comprising:

calculating a plurality of second conditional probabilities based on the plurality of performance data and the plurality of statistical data;

obtaining second estimated used lifetime data based on the plurality of second conditional probabilities and the lifetime calculation model, the second estimated used lifetime data corresponding to the plurality of performance data; and calculating the remaining useful lifetime of the at least one target memory device based on subtracting used lifetime of the at least one target memory device from initial guaranteed lifetime of the at least one target memory device, the used lifetime corresponding to the second estimated used lifetime data.

15. The method of claim 14, wherein second uncertainty data representing uncertainty of the second estimated used lifetime data is obtained based on the plurality of second conditional probabilities and the lifetime calculation model, and wherein the second estimated used lifetime data is selectively re-obtained based on the second uncertainty data.

16. The method of claim 13, wherein the plurality of unused memory devices and the at least one target memory device are memory devices of a same type that have a same structure and are manufactured by a same process.

17. The method of claim 16, wherein each of the plurality of unused memory devices is provided as a memory package that includes two or more memory chips, wherein the at least one target memory device is provided as a memory circuit that includes two or more memory packages, wherein the method includes:

compensating the plurality of performance data, and wherein the remaining useful lifetime of the at least one target memory device is obtained based on the lifetime calculation model and the plurality of compensated performance data.

18. The method of claim 13, wherein the at least one target memory device includes a plurality of target memory devices, and wherein average remaining useful lifetime of the plurality of target memory devices is obtained based on the plurality of performance data measured from the plurality of target memory devices.

19. The method of claim 18, wherein the plurality of performance data are measured only from first target memory devices among the plurality of target memory devices.

20. A system comprising:

a reliability testing equipment comprising at least one first processor and at least one first memory configured to store first program codes executed using the at least one first processor to perform an accelerated aging test on a memory device;

a performance measuring equipment comprising at least one second processor and at least one second memory configured to store second program codes executed using the at least one second processor to measure a plurality of performances of the memory device;

at least one third processor; and a non-transitory computer readable medium configured to store third program codes executed using the at least one third processor to generate a lifetime calculation model for obtaining remaining useful lifetime of a used memory device, wherein the at least one third processor is configured, by executing the third program codes, to:

receive, from the reliability testing equipment and the performance measuring equipment, a plurality of performance measurement data, the plurality of performance measurement data being associated with a plurality of performances of a plurality of unused memory devices based on the accelerated aging test performing on the plurality of unused memory devices, the used memory device and the plurality of unused memory devices being memory devices of a same type; and input the plurality of performance measurement data into the lifetime calculation model to obtain a trained lifetime calculation model based on a plurality of conditional probabilities, the plurality of conditional probabilities being based on a plurality of sample performance data and a plurality of statistical data, the plurality of sample performance data being associated with the plurality of performances, the plurality of statistical data being based on a statistical distribution approximation on the plurality of performance measurement data, the trained lifetime calculation model being configured to output, based on inputting a plurality of performance data of the used memory device, estimated used lifetime data and uncertainty data of the used memory device, the estimated used lifetime data corresponding to the plurality of sample performance data, the uncertainty data representing uncertainty of the estimated used lifetime data.

* * * * *